United States Patent
Iyoshi et al.

(10) Patent No.: US 12,480,692 B2
(45) Date of Patent: Nov. 25, 2025

(54) REFRIGERATION CYCLE SYSTEM, HEAT SOURCE UNIT, AND REFRIGERATION CYCLE APPARATUS

(71) Applicant: DAIKIN INDUSTRIES, LTD., Osaka (JP)

(72) Inventors: Yuuta Iyoshi, Osaka (JP); Yoshiki Yamanoi, Osaka (JP)

(73) Assignee: Daikin Industries, Ltd., Osaka (JP)

( * ) Notice: Subject to any disclaimer, the term of this patent is extended or adjusted under 35 U.S.C. 154(b) by 313 days.

(21) Appl. No.: 17/981,951

(22) Filed: Nov. 7, 2022

(65) Prior Publication Data

US 2023/0065072 A1   Mar. 2, 2023

Related U.S. Application Data

(63) Continuation of application No. PCT/JP2021/017688, filed on May 10, 2021.

(30) Foreign Application Priority Data

May 8, 2020   (JP) ................................. 2020-082787

(51) Int. Cl.
  *F25B 29/00*   (2006.01)
  *F25B 41/42*   (2021.01)
(52) U.S. Cl.
  CPC ............ *F25B 29/003* (2013.01); *F25B 41/42* (2021.01)
(58) Field of Classification Search
  CPC ................ F25B 13/00; F25B 2313/007; F25B 2313/0233; F25B 2313/0272;
  (Continued)

(56) References Cited

U.S. PATENT DOCUMENTS

| 10,184,676 B2 * | 1/2019 | Kawano .................. F25B 13/00 |
| 2009/0031739 A1 | 2/2009 | Kasahara et al. |

(Continued)

FOREIGN PATENT DOCUMENTS

| EP | 3 348 934 A1 | 7/2018 |
| EP | 3 643 988 A1 | 4/2020 |

(Continued)

OTHER PUBLICATIONS

International Preliminary Report on Patentability and English translation of the Written Opinion of the International Searching Authority for International Application No. PCT/JP2021/017688, dated Nov. 17, 2022.

(Continued)

*Primary Examiner* — Henry T Crenshaw
(74) *Attorney, Agent, or Firm* — Birch, Stewart, Kolasch & Birch, LLP

(57) ABSTRACT

A refrigeration cycle system includes: a heat source circuit including a secondary-side compressor, a cascade heat exchanger, a secondary-side switching mechanism, and a suction flow path; a plurality of utilization circuits respectively including utilization-side heat exchanger; a first communication pipe; a second communication pipe; a third communication pipe; a connection path; and a first on-off valve. The first communication pipe and the first heat source pipe connect the plurality of utilization-side heat exchangers and the secondary-side switching mechanism. The second communication pipe and the second heat source pipe connect the plurality of utilization-side heat exchangers and suction flow path. The third communication pipe, the fourth heat source pipe, and the fifth heat source pipe connect the plurality of utilization-side heat exchangers and the cascade heat exchanger. The connection path connects the first communication pipe and the second communication pipe.

(Continued)

The first on-off valve switches between a state in which the first communication pipe and the second communication pipe connect and a state in which they do not connect.

19 Claims, 11 Drawing Sheets

(58) Field of Classification Search
CPC ...... F25B 2313/0314; F25B 2313/0315; F25B 2400/0401; F25B 29/003; F25B 49/02; F25B 7/00; F25B 9/008; F25B 2600/2519; F25B 41/42
See application file for complete search history.

(56) References Cited

U.S. PATENT DOCUMENTS

| | | | |
|---|---|---|---|
| 2009/0255284 A1 | 10/2009 | Yoshimi | |
| 2010/0000245 A1* | 1/2010 | Kasahara | F25B 13/00 62/222 |
| 2017/0010027 A1 | 1/2017 | Liu et al. | |

FOREIGN PATENT DOCUMENTS

| | | |
|---|---|---|
| JP | 59-38568 A | 3/1984 |
| JP | 8-210717 A | 8/1996 |
| JP | 2001-336856 A | 12/2001 |
| JP | 2004-190917 A | 7/2004 |
| JP | 3829340 B2 | 10/2006 |
| JP | 2007-218460 A | 8/2007 |
| JP | 2007-240108 A | 9/2007 |
| JP | 2008-39332 A | 2/2008 |
| JP | 2009-210142 A | 9/2009 |
| JP | 2013-210150 A | 10/2013 |
| JP | 5488678 B1 | 5/2014 |
| JP | 2016-11783 A | 1/2016 |
| JP | 2019-20090 A | 2/2019 |
| WO | WO 2018/235832 A1 | 12/2018 |

OTHER PUBLICATIONS

International Preliminary Report on Patentability and English translation of the Written Opinion of the International Searching Authority for International Application No. PCT/JP2021/017705, dated Nov. 17, 2022.
Extended European Search Report for European Application No. 21799922.6, dated Jan. 2, 2024.
International Search Report for PCT/JP2021/017688 (PCT/ISA/210) mailed on Jun. 8, 2021.
Written Opinion of the International Searching Authority for PCT/JP2021/017688 (PCT/ISA/237) mailed on Jun. 8, 2021.
Extended European Search Report for corresponding European Application No. 21800672.4, dated Sep. 5, 2023.

* cited by examiner

REFRIGERATION CYCLE SYSTEM, HEAT SOURCE UNIT, AND REFRIGERATION CYCLE APPARATUS

CROSS REFERENCE TO RELATED APPLICATIONS

This application is a Continuation of PCT International Application No. PCT/JP2021/017688, filed on May 10, 2021, which claims priority under 35 U.S.C. 119(a) to Patent Application No. 2020-082787, filed in Japan on May 8, 2020, all of which are hereby expressly incorporated by reference into the present application.

TECHNICAL FIELD

The present disclosure relates to a refrigeration cycle system, a heat source unit, and a refrigeration cycle apparatus.

BACKGROUND ART

Conventionally, there has been proposed a refrigeration cycle apparatus configured by connecting a heat source unit and a plurality of utilization units via a high and low-pressure gas connection pipe, a low-pressure gas connection pipe, and a liquid connection pipe, as described in Patent Literature 1 (JP 2016-11783 A). The refrigeration cycle apparatus is filled with a flammable refrigerant such as R32, and enables a simultaneous cooling and heating operation.

When all of the plurality of utilization units perform heating operations in the refrigeration cycle apparatus, a refrigerant discharged from a compressor is supplied to the plurality of utilization units via the high and low-pressure gas connection pipe among the three connection pipes.

SUMMARY

A refrigeration cycle system according to a first aspect is a refrigeration cycle system using a carbon dioxide refrigerant, and includes a heat source circuit, a plurality of utilization circuits, a first communication flow path, a second communication flow path, a third communication flow path, a connection pipe, and a second switching mechanism. The heat source circuit includes a compressor, a heat source heat exchanger, a first switching mechanism, and a suction flow path. The first switching mechanism is located between a pipe through which a refrigerant discharged from the compressor flows and the heat source heat exchanger, and switches a flow path. The suction flow path connects the first switching mechanism and a pipe through which the refrigerant to be sucked into the compressor flows. Each of the plurality of utilization circuits includes a utilization heat exchanger. The first communication flow path connects the plurality of utilization heat exchangers and the first switching mechanism. The second communication flow path connects the plurality of utilization heat exchangers and the suction flow path. The third communication flow path connects the plurality of utilization heat exchangers and the heat source heat exchanger. The connection pipe connects the first communication flow path and the second communication flow path. The second switching mechanism switches between a first state in which the first communication flow path and the second communication flow path connect and a second state in which the first communication flow path and the second communication flow path do not connect.

DESCRIPTION OF EMBODIMENTS

(1) Configuration of Refrigeration Cycle System

Figure 1:
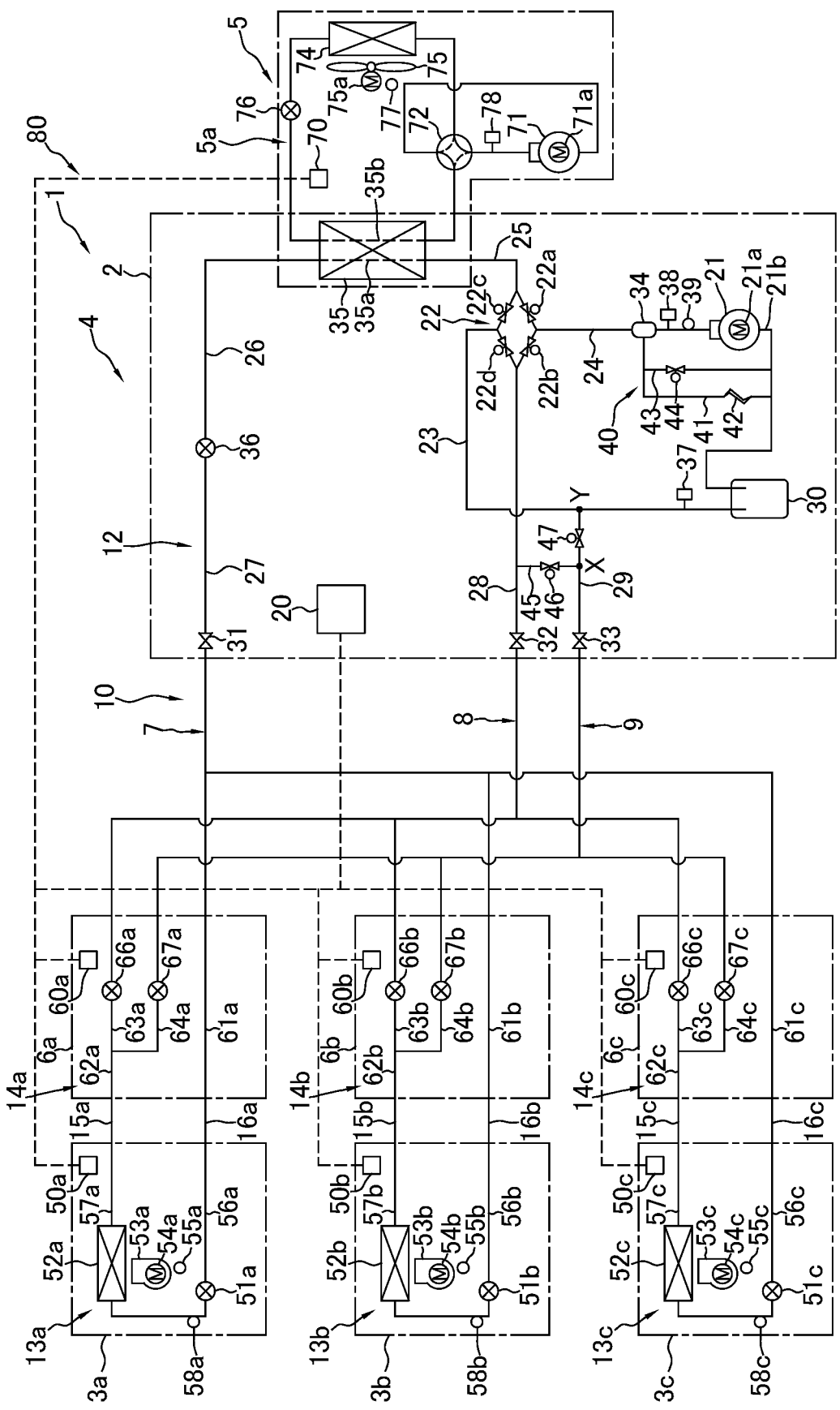
FIG. 1 is a schematic configuration view of a refrigeration cycle system.
Figure 2:
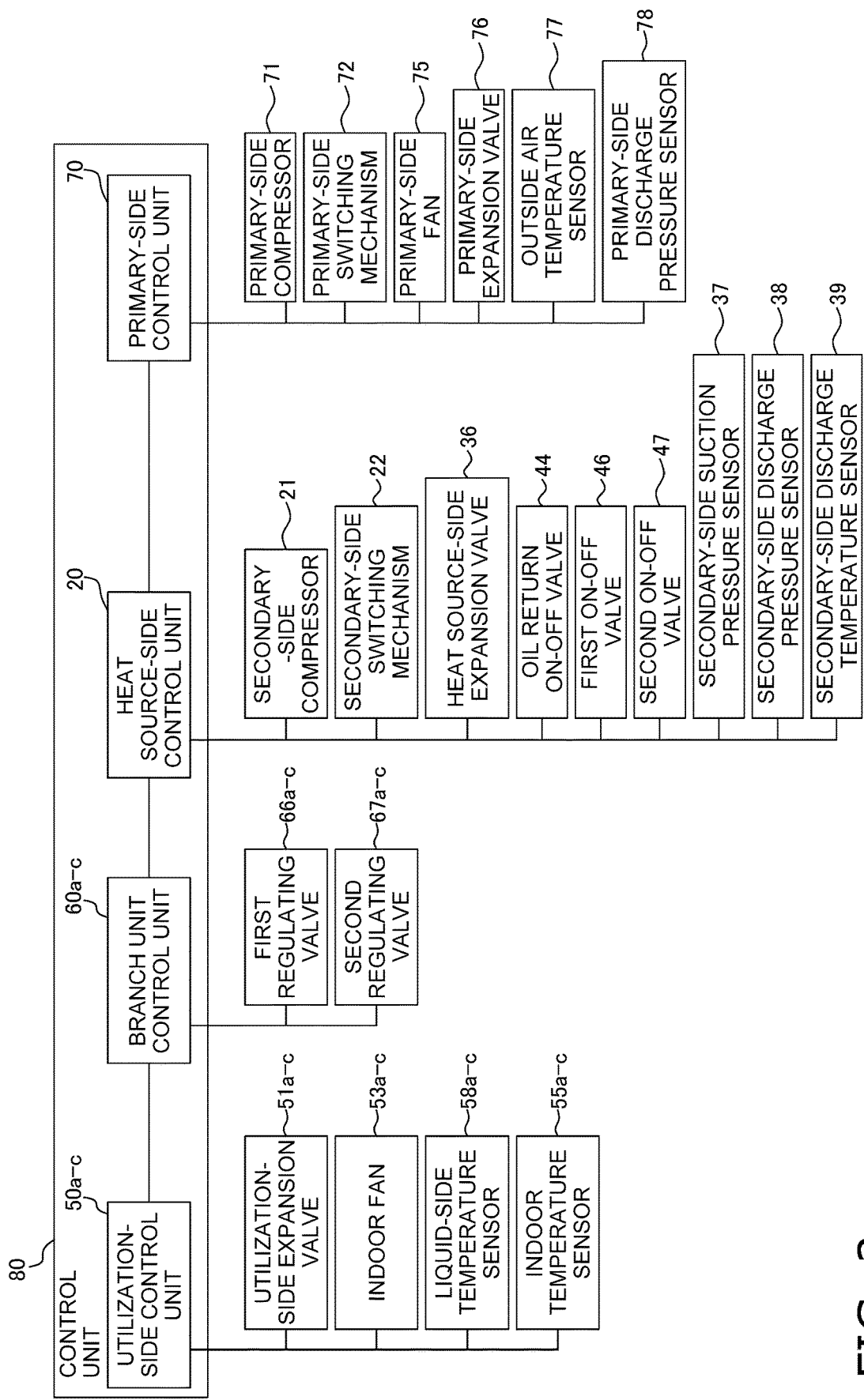
FIG. 2 is a schematic functional block configuration view of the refrigeration cycle system.
Figure 3:
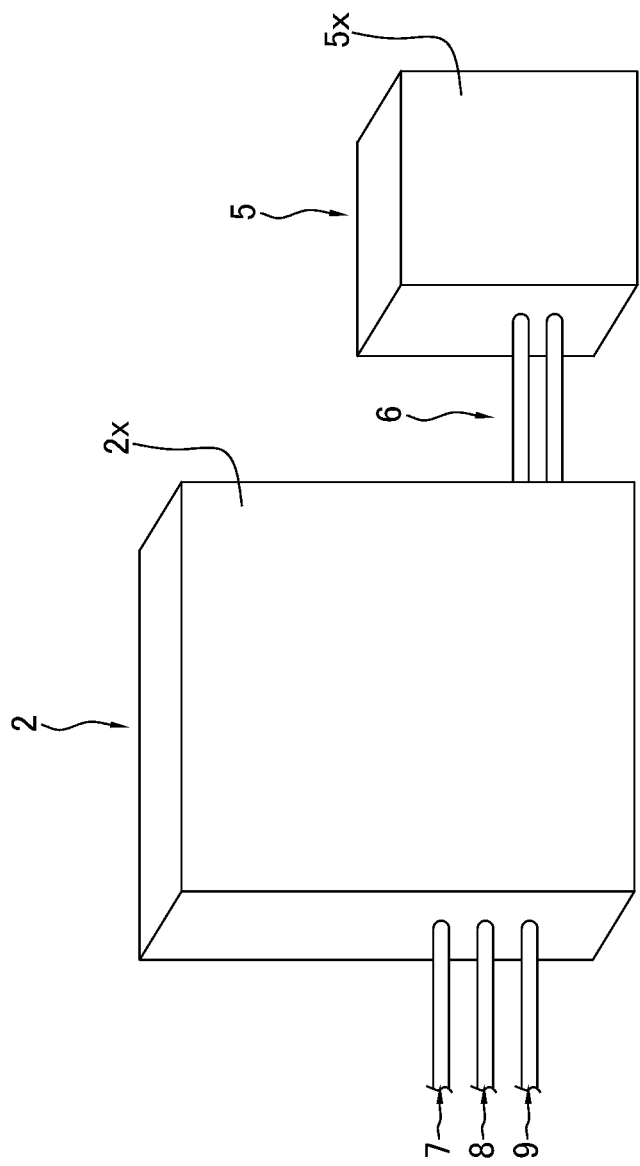
FIG. 3 is an external schematic perspective view illustrating a state in which a primary-side unit and a heat source unit are connected.

FIG. 1 is a schematic configuration view of a refrigeration cycle system 1. FIG. 2 is a schematic functional block configuration view of the refrigeration cycle system 1. FIG. 3 is an external schematic perspective view illustrating a state in which a primary-side unit 5 and a heat source unit 2 are connected.

The refrigeration cycle system 1 is an apparatus that is used for cooling and heating a room of a building or the like by performing a vapor compression refrigeration cycle operation. The refrigeration cycle system 1 includes the primary-side unit 5 and a secondary-side unit 4 (corresponding to a refrigeration cycle apparatus), and includes a dual refrigerant circuit that performs a dual refrigeration cycle.

The primary-side unit 5 includes a vapor compression primary-side refrigerant circuit 5a. A refrigerant, such as R32, is sealed as a refrigerant in the primary-side refrigerant circuit 5a.

The secondary-side unit 4 includes a vapor compression secondary-side refrigerant circuit 10. Carbon dioxide is sealed as a refrigerant in the secondary-side refrigerant circuit 10. The primary-side unit 5 and the secondary-side unit 4 are connected via a cascade heat exchanger 35 to be described later.

The secondary-side unit 4 is configured such that a plurality of utilization units 3a, 3b, and 3c and a plurality of branch units 6a, 6b, and 6c corresponding to the utilization units 3a, 3b, and 3c are connected via corresponding first connection pipes 15a, 15b, and 15c and second connection pipes 16a, 16b, and 16c, and the plurality of branch units 6a, 6b, and 6c and the heat source unit 2 are connected via three communication pipes 7, 8, and 9. In the present embodiment, the plurality of utilization units 3a, 3b, and 3c are three of a first utilization unit 3a, a second utilization unit 3b, and a third utilization unit 3c. In the present embodiment, the plurality of branch units 6a, 6b, and 6c are three of a first branch unit 6a, a second branch unit 6b, and a third branch unit 6c. In the present embodiment, one heat source unit 2 is provided. The three refrigerant communication pipes are a first communication pipe 8, a second communication pipe 9, and a third communication pipe 7. Depending on an operation state, any one of the refrigerant in a supercritical state, the refrigerant in a gas-liquid two-phase state, and the refrigerant in a gas state flows through the first communication pipe 8. Depending on an operation state, either the refrigerant in a gas-liquid two-phase state or the refrigerant in a gas state flows through the second communication pipe 9. Depending on an operation state, any one of the refrigerant in a supercritical state, the refrigerant in a gas-liquid two-phase state, and the refrigerant in a liquid state flows through the third communication pipe 7.

The refrigeration cycle system 1 is configured such that each of the utilization units 3a, 3b, and 3c can individually perform a cooling operation or a heating operation, and heat can be recovered between the utilization units by sending the refrigerant from the utilization unit performing a heating operation to the utilization unit performing a cooling operation. Specifically, in the present embodiment, heat is recovered by performing a cooling main operation or a heating main operation in which a cooling operation and a heating operation are simultaneously performed. In addition, the refrigeration cycle system 1 is configured to balance the heat load of the heat source unit 2 depending on the heat load of the whole of the plurality of utilization units 3a, 3b, and 3c also in consideration of the above heat recovery (the cooling main operation or the heating main operation).

(2) Primary-Side Unit

The primary-side unit 5 includes the primary-side refrigerant circuit 5a, a primary-side fan 75, and a primary-side control unit 70. The primary-side unit 5 also includes a primary-side casing 5x that houses in its inside a part of the primary-side refrigerant circuit 5a, the primary-side fan 75, and the primary-side control unit 70.

The primary-side refrigerant circuit 5a includes a primary-side compressor 71, a primary-side switching mechanism 72, a primary-side heat exchanger 74, a primary-side expansion valve 76, and a cascade heat exchanger 35 shared by the secondary-side refrigerant circuit 10. The primary-side refrigerant circuit 5a constitutes a primary-side refrigerant circuit in the refrigeration cycle system 1, and the refrigerant, such as R32, circulates in the primary-side refrigerant circuit 5a.

The primary-side compressor 71 is equipment for compressing the primary-side refrigerant, and includes, for example, a positive displacement compressor of a scroll type or the like whose operating capacity can be varied by inverter controlling a compressor motor 71a.

When the cascade heat exchanger 35 is allowed to function as an evaporator for the primary-side refrigerant, the primary-side switching mechanism 72 is brought into a fifth connection state in which the suction side of the primary-side compressor 71 and the gas side of a primary-side flow path 35b of the cascade heat exchanger 35 are connected (see the solid line of the primary-side switching mechanism 72 of FIG. 1). When the cascade heat exchanger 35 is allowed to function as a radiator for the primary-side refrigerant, the primary-side switching mechanism 72 is brought into a sixth connection state in which the discharge-side of the primary-side compressor 71 and the gas side of the primary-side flow path 35b of the cascade heat exchanger 35 are connected (see the broken line of the primary-side switching mechanism 72 of FIG. 1). The primary-side switching mechanism 72 is equipment capable of switching the flow path of the refrigerant in the primary-side refrigerant circuit 5a, as described above, and includes, for example, a four-way switching valve. By changing the switching state of the primary-side switching mechanism 72, the cascade heat exchanger 35 can be allowed to function as an evaporator or radiator for the primary-side refrigerant.

The cascade heat exchanger 35 is equipment for exchanging heat between a refrigerant, such as R32, that is the primary-side refrigerant and carbon dioxide that is the secondary-side refrigerant, without mixing them together. The cascade heat exchanger 35 includes, for example, a plate-type heat exchanger. The cascade heat exchanger 35 includes a secondary-side flow path 35a belonging to the secondary-side refrigerant circuit 10 and the primary-side flow path 35b belonging to the primary-side refrigerant circuit 5a. The secondary-side flow path 35a has a gas side connected to the secondary-side switching mechanism 22 via a third heat source pipe 25, and a liquid side connected to a heat source-side expansion valve 36 via a fourth heat source pipe 26 (corresponding to a part of the third communication flow path). The primary-side flow path 35b has a gas side connected to the primary-side compressor 71 via the primary-side switching mechanism 72 and a liquid side connected to the primary-side expansion valve 76.

The primary-side expansion valve 76 is provided in a liquid pipe between the cascade heat exchanger 35 and the primary-side heat exchanger 74 of the primary-side refrigerant circuit 5a. The primary-side expansion valve 76 is an electric expansion valve whose opening degree can be adjusted that performs: adjustment of the flow rate of the primary-side refrigerant flowing through a portion, on the liquid side, of the primary-side refrigerant circuit 5a; and the like.

The primary-side heat exchanger 74 is equipment for exchanging heat between the primary-side refrigerant and indoor air, and includes, for example, a fin-and-tube heat exchanger including a large number of heat transfer tubes and fins.

The primary-side fan 75 is provided in the primary-side unit 5, and generates an air flow in which outdoor air is guided to the primary-side heat exchanger 74, the outdoor air is allowed to exchange heat with the primary-side refrigerant flowing through the primary-side heat exchanger 74, and then the outdoor air is discharged outdoors. The primary-side fan 75 is driven by a primary-side fan motor 75a.

The primary-side unit 5 is also provided with various sensors. Specifically, there are provided an outside air temperature sensor 77 that detects the temperature of the outdoor air before passing through the primary-side heat exchanger 74, and a primary-side discharge pressure sensor 78 that detects the pressure of the primary-side refrigerant discharged from the primary-side compressor 71.

The primary-side control unit 70 controls an operation of each of the parts 71(71a), 72, 75(75a), and 76 constituting the primary-side unit 5. The primary-side control unit 70 includes a processor, such as a CPU or a microcomputer, and a memory provided to control the primary-side unit 5, and is configured to be capable of exchanging control signals and the like with a remote controller (not illustrated) and exchanging control signals and the like with a heat source-side control unit 20, branch unit control units 60a to 60c, and utilization-side control units 50a to 50c of the secondary-side unit 4.

(3) Secondary-Side Unit

The secondary-side unit 4 is configured by connecting the plurality of utilization units 3a, 3b, and 3c, the plurality of branch units 6a, 6b, and 6c, and the heat source unit 2 to each other. The respective utilization units 3a, 3b, and 3c are connected one-to-one to the corresponding branch units 6a, 6b, and 6c. Specifically, the utilization unit 3a and the branch unit 6a are connected via the first connection pipe 15a and the second connection pipe 16a, the utilization unit 3b and the branch unit 6b are connected via the first connection pipe 15b and the second connection pipe 16b, and the utilization unit 3c and the branch unit 6c are connected via the first connection pipe 15c and the second connection pipe 16c. The respective branch units 6a, 6b, and 6c are connected to the heat source unit 2 via three communication pipes of the third communication pipe 7 (corresponding to a part of the third communication flow path), the first communication pipe 8 (corresponding to a part of the first communication flow path), and the second communication pipe 9 (corresponding to a part of the second communication flow path). Specifically, the third communication pipe 7, the first communication pipe 8, and the second communication pipe 9, extending from the heat source unit 2, are each branched into a plurality of pipes, which are connected to the respective branch units 6a, 6b, and 6c.

(3-1) Utilization Unit

The utilization units 3a, 3b, and 3c are installed by being embedded, suspended, or the like in or from the ceiling of a room of a building or the like, or by being hung on the wall surface of the room. The utilization units 3a, 3b, and 3c are connected to the heat source unit 2 via the communication pipes 7, 8, and 9, and respectively include utilization circuits 13a, 13b, and 13c constituting a part of the secondary-side refrigerant circuit 10.

Next, configurations of the utilization units 3a, 3b, and 3c will be described. Note that the second utilization unit 3b and the third utilization unit 3c have the same configuration as that of the first utilization unit 3a, so that only the configuration of the first utilization unit 3a will be described here. For the configurations of the second utilization unit 3b and the third utilization unit 3c, description of each part will be omitted by adding a subscript "b" or "c" instead of a subscript "a" that is a reference signal indicating the each part of the first utilization unit 3a.

The first utilization unit 3a mainly includes the utilization circuit 13a constituting a part of the secondary-side refrigerant circuit 10, an indoor fan 53a, and the utilization-side control unit 50a. The indoor fan 53a includes an indoor fan motor 54a. The second utilization unit 3b includes the utilization circuit 13b, an indoor fan 53b, the utilization-side control unit 50b, and an indoor fan motor 54b. The third utilization unit 3c includes the utilization circuit 13c, an indoor fan 53c, the utilization-side control unit 50c, and an indoor fan motor 54c.

The utilization circuit 13a mainly includes a utilization-side heat exchanger 52a (corresponding to the utilization heat exchanger), a first utilization pipe 57a, a second utilization pipe 56a, and a utilization-side expansion valve 51a.

The utilization-side heat exchanger 52a is equipment for exchanging heat between the refrigerant and the indoor air, and includes, for example, a fin-and-tube heat exchanger including a large number of heat transfer tubes and fins.

Here, the utilization unit 3a includes the indoor fan 53a that: sucks indoor air into the unit; allows the indoor air to exchange heat with the refrigerant flowing through the utilization-side heat exchanger 52a; and then supplies the indoor air as supply air to the room. The indoor fan 53a is driven by the indoor fan motor 54a.

One end of the second utilization pipe 56a is connected to the liquid side (the side opposite to the gas side) of the utilization-side heat exchanger 52a of the first utilization unit 3a. The other end of the second utilization pipe 56a is connected to the second connection pipe 16a. The above utilization-side expansion valve 51a is provided in the middle of the second utilization pipe 56a.

The utilization-side expansion valve 51a is an electric expansion valve whose opening degree can be adjusted that performs: adjustment of the flow rate of the refrigerant flowing through the utilization-side heat exchanger 52a; and the like. The utilization-side expansion valve 51a is provided in the second utilization pipe 56a.

One end of the first utilization pipe 57a is connected to the gas side of the utilization-side heat exchanger 52a of the first utilization unit 3a. In the present embodiment, the first utilization pipe 57a is connected to a side of the utilization-side heat exchanger 52a, the side being opposite to the utilization-side expansion valve 51a side. The other end of the first utilization pipe 57a is connected to the first connection pipe 15a.

The utilization unit 3a is also provided with various sensors. Specifically, a liquid-side temperature sensor 58a that detects the temperature of the refrigerant on the liquid side of the utilization-side heat exchanger 52a is provided. The utilization unit 3a is also provided with an indoor temperature sensor 55a that detects an indoor temperature, or the temperature of the air that is taken in from the room and is yet to pass through the utilization-side heat exchanger 52a.

The utilization-side control unit 50a controls an operation of each of the parts 51a and 53a (54a) constituting the utilization unit 3a. The utilization-side control unit 50a includes a processor, such as a CPU or a microcomputer, and a memory provided to control the utilization unit 3a, and is configured to be capable of exchanging control signals and the like with a remote controller (not illustrated) and exchanging control signals and the like with the heat source-side control unit 20 and the branch unit control units 60a to 60c of the secondary-side unit 4 and with the primary-side control unit 70 of the primary-side unit 5.

(3-2) Branch Unit

The branch units 6a, 6b, and 6c are connected one-to-one to the utilization units 3a, 3b, and 3c, and are installed in a space or the like above the ceiling of a room of a building or the like. The branch units 6a, 6b, and 6c are connected to the heat source unit 2 via the communication pipes 7, 8, and 9. The branch units 6a, 6b, and 6c respectively include branch circuits 14a, 14b, and 14c constituting a part of the secondary-side refrigerant circuit 10.

Next, configurations of the branch units 6a, 6b, and 6c will be described. Note that the second branch unit 6b and the third branch unit 6c have the same configuration as that of the first branch unit 6a, so that only the configuration of the first branch unit 6a will be described here. For the configurations of the second branch unit 6b and the third branch unit 6c, description of each part will be omitted by adding a subscript "b" or "c" instead of a subscript "a" that is a reference signal indicating each part of the first branch unit 6a.

The first branch unit 6a mainly includes the branch circuit 14a constituting a part of the secondary-side refrigerant circuit 10, and the branch unit control unit 60a. The second branch unit 6b includes the branch circuit 14b and the branch unit control unit 60b. The third branch unit 6c includes the branch circuit 14c and the branch unit control unit 60c.

The branch circuit 14a mainly includes a merge pipe 62a, a first branch pipe 63a, a second branch pipe 64a, a first regulating valve 66a, a second regulating valve 67a, and a third branch pipe 61a.

One end of the merge pipe 62a is connected to the first connection pipe 15a. The first branch pipe 63a and the second branch pipe 64a are branched and connected to the other end of the merge pipe 62a.

A side of the first branch pipe 63a, the side being opposite to the merge pipe 62 side, is connected to the first communication pipe 8. The first branch pipe 63a is provided with the first regulating valve 66a that can be opened and closed. Note that an electric expansion valve whose opening degree can be adjusted is adopted here as the first regulating valve 66a, but an electromagnetic valve or the like that can only be opened and closed may be adopted.

A side of the second branch pipe 64a, the side being opposite to the merge pipe 62 side, is connected to the second communication pipe 9. The second branch pipe 64a is provided with the second regulating valve 67a that can be opened and closed. Note that an electric expansion valve whose opening degree can be adjusted is adopted here as the second regulating valve 67a, but an electromagnetic valve or the like that can only be opened and closed may be adopted.

One end of the third branch pipe 61a is connected to the second connection pipe 16a. The other end of the third branch pipe 61a is connected to the third communication pipe 7.

Then, when a cooling operation to be described later is performed, the first branch unit 6a can function as follows by opening the first regulating valve 66a and the second regulating valve 67a. Specifically, the first branch unit 6a sends the refrigerant, flowing into the third branch pipe 61a through the third communication pipe 7, to the second connection pipe 16a. The refrigerant, flowing through the second utilization pipe 56a of the first utilization unit 3a through the second connection pipe 16a, is sent to the utilization-side heat exchanger 52a of the first utilization unit 3a through the utilization-side expansion valve Ma. The refrigerant sent to the utilization-side heat exchanger 52a evaporates by exchanging heat with the indoor air, and then flows through the first connection pipe 15a via the first utilization pipe 57a. The refrigerant having flowed through the first connection pipe 15a is sent to the merge pipe 62a of the first branch unit 6a. The refrigerant having flowed through the merge pipe 62 branches and flows into the first branch pipe 63a and the second branch pipe 64a. The refrigerant, having passed through the first regulating valve 66a in the first branch pipe 63a, is sent to the first communication pipe 8. The refrigerant, having passed through the second regulating valve 67a in the second branch pipe 64a, is sent to the second communication pipe 9.

In a case where the first utilization unit 3a cools the room when the cooling main operation or heating main operation to be described later is performed, the first branch unit 6a can function as follows by closing the first regulating valve 66a and opening the second regulating valve 67a. Specifically, the first branch unit 6a sends the refrigerant, flowing into the third branch pipe 61a through the third communication pipe 7, to the second connection pipe 16a. The refrigerant, flowing through the second utilization pipe 56a of the first utilization unit 3a through the second connection pipe 16a, is sent to the utilization-side heat exchanger 52a of the first utilization unit 3a through the utilization-side expansion valve 51a. The refrigerant sent to the utilization-side heat exchanger 52a evaporates by exchanging heat with the indoor air, and then flows through the first connection pipe 15a via the first utilization pipe 57a. The refrigerant having flowed through the first connection pipe 15a is sent to the merge pipe 62a of the first branch unit 6a. The refrigerant, having flowed through the merge pipe 62a, flows to the second branch pipe 64a, passes through the second regulating valve 67a, and then is sent to the second communication pipe 9.

When the heating operation to be described later is performed, the first branch unit 6a can function as follows by opening or closing the second regulating valve 67a depending on an operation situation as described later, and by opening the first regulating valve 66a. Specifically, in the first branch unit 6a, the refrigerant, flowing into the first branch pipe 63a through the first communication pipe 8, passes through the first regulating valve 66a and is sent to the merge pipe 62. When the second regulating valve 67a is controlled to be opened in the first branch unit 6a, the refrigerant, flowing into the second branch pipe 64a through the second communication pipe 9, passes through the second regulating valve 67a and is sent to the merge pipe 62. The refrigerant, having flowed through the merge pipe 62a, flows through the first utilization pipe 57a of the utilization unit 3a via the first connection pipe 15a and is sent to the utilization-side heat exchanger 52a. The refrigerant sent to the utilization-side heat exchanger 52a evaporates by exchanging heat with the indoor air, and then passes through the utilization-side expansion valve Ma provided in the second utilization pipe 56a. The refrigerant, having passed through the second utilization pipe 56a, flows through the third branch pipe 61a of the first branch unit 6a via the second connection pipe 16a, and then is sent to the third communication pipe 7.

In a case where the first utilization unit 3a heats the room when the cooling main operation or heating main operation to be described later is performed, the first branch unit 6a can function as follows by closing the second regulating valve 67a and opening the first regulating valve 66a. Specifically, in the first branch unit 6a, the refrigerant, flowing into the first branch pipe 63a through the first communication pipe 8, passes through the first regulating valve 66a and is sent to the merge pipe 62. The refrigerant, having flowed through the merge pipe 62a, flows through the first utilization pipe 57a of the utilization unit 3a via the first connection pipe 15a and is sent to the utilization-side heat exchanger 52a. The refrigerant sent to the utilization-side heat exchanger 52a evaporates by exchanging heat with the indoor air, and then passes through the utilization-side expansion valve Ma provided in the second utilization pipe 56a. The refrigerant, having passed through the second utilization pipe 56a, flows through the third branch pipe 61a of the first branch unit 6a via the second connection pipe 16a, and then is sent to the third communication pipe 7.

Not only the first branch unit 6a, but also the second branch unit 6b and the third branch unit 6c similarly have such a function. Therefore, each of the first branch unit 6a, the second branch unit 6b, and the third branch unit 6c can individually switch between whether each of the utilization-side heat exchangers 52a, 52b, and 52c is allowed to function as an evaporator for the refrigerant and whether it is allowed to function as a radiator for the refrigerant.

The branch unit control unit 60a controls an operation of each of the parts 66a and 67a constituting the branch unit 6a.

The branch unit control unit 60a includes a processor, such as a CPU or a microcomputer, and a memory provided to control the branch unit 6a, and is configured to be capable of exchanging control signals and the like with a remote controller (not illustrated) and exchanging control signals and the like with the heat source-side control unit 20 and the utilization units 3a to 3c of the secondary-side unit 4 and with the primary-side control unit 70 of the primary-side unit 5.

(3-3) Heat Source Unit

The heat source unit 2 is installed: in a space different from the space where the utilization units 3a, 3b, and 3c and the branch units 6a, 6b, and 6c are disposed; on the roof; or the like. The heat source unit 2 is connected to the branch units 6a, 6b, and 6c via the communication pipes 7, 8, and 9, and constitutes a part of the secondary-side refrigerant circuit 10.

Next, a configuration of the heat source unit 2 will be described. The heat source unit 2 mainly includes a heat source circuit 12 constituting a part of the secondary-side refrigerant circuit 10.

The heat source circuit 12 mainly includes a secondary-side compressor 21 (corresponding to the compressor), a secondary-side switching mechanism 22 (corresponding to the first switching mechanism), a first heat source pipe 28 (corresponding to a part of the first communication flow path), a second heat source pipe 29 (corresponding to a part of the second communication flow path), a suction flow path 23, a discharge flow path 24, a third heat source pipe 25, a fourth heat source pipe 26 (corresponding to a part of the third communication flow path), a fifth heat source pipe 27 (corresponding to a part of the third communication flow path), a cascade heat exchanger 35 (corresponding to the heat source heat exchanger), a heat source-side expansion valve 36, a third shutoff valve 31, a first shutoff valve 32, a second shutoff valve 33, an accumulator 30, a connection path 45 (corresponding to the connection pipe), a first on-off valve 46, a second on-off valve 47, an oil separator 34, an oil return circuit 40, and the heat source-side control unit 20. The heat source circuit 12 further includes a secondary-side heat source casing 2x housing these elements. The secondary-side heat source casing 2x is formed in a substantially rectangular parallelepiped shape by a bottom frame, a top panel, and four side plates.

The secondary-side compressor 21 is equipment for compressing the secondary-side refrigerant, and includes, for example, a positive displacement compressor of a scroll type or the like whose operating capacity can be varied by inverter controlling a compressor motor 21a. Note that the secondary-side compressor 21 is controlled such that, depending on the load during operation, the operating capacity is made larger as the load is larger.

The secondary-side switching mechanism 22 is a mechanism capable of switching the connection state of the secondary-side refrigerant circuit 10, particularly, the flow path of the refrigerant in the heat source circuit 12. In the present embodiment, the secondary-side switching mechanism 22 is configured by disposing, side by side in an annular flow path, four switching valves 22a to 22d each being a two-way valve. Note that, instead of this, a combination of a plurality of three-way switching valves may be used as the secondary-side switching mechanism 22. The secondary-side switching mechanism 22 includes the first switching valve 22a provided in a flow path connecting the discharge flow path 24 and the third heat source pipe 25, the second switching valve 22b provided in a flow path connecting the discharge flow path 24 and the first heat source pipe 28, the third switching valve 22c provided in a flow path connecting the suction flow path 23 and the third heat source pipe 25, and the fourth switching valve 22d provided in a flow path connecting the suction flow path 23 and the first heat source pipe 28. In the present embodiment, each of the first switching valve 22a, the second switching valve 22b, the third switching valve 22c, and the fourth switching valve 22d is an electromagnetic valve that can be switched between an opened state and a closed state.

When the cascade heat exchanger 35 is allowed to function as a radiator for the secondary-side refrigerant, the secondary-side switching mechanism 22 is brought into a first connection state in which while the first switching valve 22a is opened, the discharge side of the secondary-side compressor 21 and the gas side of the secondary-side flow path 35a of the cascade heat exchanger 35 are connected and the third switching valve 22c is closed. When the cascade heat exchanger 35 is allowed to function as an evaporator for the secondary-side refrigerant, the secondary-side switching mechanism 22 is brought into a second connection state in which while the third switching valve 22c is opened, the suction side of the secondary-side compressor 21 and the gas side of the secondary-side flow path 35a of the cascade heat exchanger 35 are connected and the first switching valve 22a is closed. When the secondary-side refrigerant discharged from the secondary-side compressor 21 is sent to the first communication pipe 8, the secondary-side switching mechanism 22 is brought into a third connection state in which while the second switching valve 22b is opened, the discharge side of the secondary-side compressor 21 and the first communication pipe 8 are connected and the fourth switching valve 22d is closed. When the refrigerant flowing through the first communication pipe 8 is sucked into the secondary-side compressor 21, the secondary-side switching mechanism 22 is brought into a fourth connection state in which while the fourth switching valve 22d is opened, the first communication pipe 8 and the suction side of the secondary-side compressor 21 are connected and the second switching valve 22b is closed.

The cascade heat exchanger 35 is equipment for exchanging heat between a refrigerant, such as R32, that is the primary-side refrigerant and carbon dioxide that is the secondary-side refrigerant, without mixing them together, as described above. The cascade heat exchanger 35 includes the secondary-side flow path 35a of the secondary-side refrigerant circuit 10, through which the secondary-side refrigerant flows, and the primary-side flow path 35b of the primary-side refrigerant circuit 5a, through which the primary-side refrigerant flows. As a result, the cascade heat exchanger 35 is shared by the primary-side unit 5 and the heat source unit 2. In the present embodiment, the cascade heat exchanger 35 is disposed inside the secondary-side heat source casing 2x that the heat source unit 2 includes. The refrigerant pipes extending from both ends of the primary-side flow path 35b of the cascade heat exchanger 35 are provided to extend to the outside of the secondary-side heat source casing 2x of the heat source unit 2.

The heat source-side expansion valve 36 is an electric expansion valve whose opening degree can be adjusted, that is connected to the liquid side of the cascade heat exchanger 35 in order to: adjust the flow rate of the secondary-side refrigerant flowing through the cascade heat exchanger 35; and the like.

The third shutoff valve 31, the first shutoff valve 32, and the second shutoff valve 33 are valves provided at connecting ports with external equipment and pipes (specifically, the communication pipes 7, 8, and 9). Specifically, the third shutoff valve 31 is connected to the third communication pipe 7 drawn from the heat source unit 2. The first shutoff valve 32 is connected to the first communication pipe 8 drawn from the heat source unit 2. The second shutoff valve 33 is connected to the second communication pipe 9 drawn from the heat source unit 2.

The first heat source pipe 28 is a refrigerant pipe that connects the first shutoff valve 32 and the secondary-side switching mechanism 22. Specifically, the first heat source pipe 28 connects the first shutoff valve 32 and a portion, between the second switching valve 22b and the fourth switching valve 22d, of the secondary-side switching mechanism 22.

The suction flow path 23 is a flow path that communicates the secondary-side switching mechanism 22 and the suction side of the secondary-side compressor 21. Specifically, the suction flow path 23 connects a portion, between the third switching valve 22c and the fourth switching valve 22d, of the secondary-side switching mechanism 22 and the suction side of the secondary-side compressor 21. The accumulator 30 is provided in the middle of the suction flow path 23.

The second heat source pipe 29 is a refrigerant pipe that connects the second shutoff valve 33 and the middle of the suction flow path 23. In the present embodiment, the second heat source pipe 29 is connected to the suction flow path 23 at a second connection point Y that is a portion between a portion, between the second switching valve 22b and the fourth switching valve 22d in the secondary-side switching mechanism 22, of the suction flow path 23 and the accumulator 30.

The discharge flow path 24 is a refrigerant pipe that connects the discharge side of the secondary-side compressor 21 and the secondary-side switching mechanism 22. Specifically, the discharge flow path 24 connects the discharge side of the secondary-side compressor 21 and a portion, between the first switching valve 22a and the second switching valve 22b, of the secondary-side switching mechanism 22.

The third heat source pipe 25 is a refrigerant pipe that connects the secondary-side switching mechanism 22 and the gas side of the cascade heat exchanger 35. Specifically, the third heat source pipe 25 connects a portion, between the first switching valve 22a and the third switching valve 22c, of the secondary-side switching mechanism 22 and the gas side end of the secondary-side flow path 35a in the cascade heat exchanger 35.

The fourth heat source pipe 26 is a refrigerant pipe that connects the liquid side (the opposite side to the gas side) of the cascade heat exchanger 35 and the heat source-side expansion valve 36. Specifically, the fourth heat source pipe 26 connects the liquid side end (the end on the opposite side to the gas side) of the secondary-side flow path 35a in the cascade heat exchanger 35 and the heat source-side expansion valve 36.

The fifth heat source pipe 27 is a refrigerant pipe that connects the heat source-side expansion valve 36 and the third shutoff valve 31.

The connection path 45 is a refrigerant flow path that connects the first heat source pipe 28 and the second heat source pipe 29. Specifically, the connection path 45 is connected to the second heat source pipe 29 at a first connection point X.

The first on-off valve 46 is an electromagnetic valve that is provided in the connection path 45 and can be switched between an opened state and a closed state.

The second on-off valve 47 is an electromagnetic valve that is provided in the second heat source pipe 29 and can be switched between an opened state and a closed state. Specifically, the second on-off valve 47 is provided, in the second heat source pipe 29, between the first connection point X, where the second heat source pipe 29 and the connection path 45 are connected, and the second connection point Y where the second heat source pipe 29 and the suction flow path 23 are connected.

The accumulator 30 is a container capable of storing the secondary-side refrigerant, and is provided on the suction side of the secondary-side compressor 21.

The oil separator 34 is provided in the middle of the discharge flow path 24. The oil separator 34 is equipment for separating the refrigerating machine oil discharged from the secondary-side compressor 21 along with the secondary-side refrigerant, from the secondary-side refrigerant and for returning the refrigerating machine oil to the secondary-side compressor 21.

The oil return circuit 40 is provided to connect the oil separator 34 and the suction flow path 23. Specifically, the oil return circuit 40 is provided such that the flow path extending from the oil separator 34 merges with a portion, between the accumulator 30 and a suction pipe 21b of the secondary-side compressor 21 (corresponding to the pipe through which the refrigerant to be sucked into the compressor flows), of the suction flow path 23. The oil return circuit 40 includes a first oil return flow path 41 and a second oil return flow path 43 that connect the oil separator 34 and the suction flow path 23 in parallel to each other. The first oil return flow path 41 is provided with an oil return capillary tube 42. The second oil return flow path 43 is provided with an oil return on-off valve 44. In the oil return capillary tube 42, the refrigerating machine oil separated in the oil separator 34 is returned to the secondary-side compressor 21 as the secondary-side compressor 21 is operated. When a predetermined oil return condition is satisfied during the operation of the secondary-side compressor 21, the oil return on-off valve 44 repeats maintaining its opened state for a predetermined time and maintaining its closed state for a predetermined time. As a result, the amount of the refrigerating machine oil to be returned through the oil return circuit 40 is controlled.

The heat source unit 2 is also provided with various sensors. Specifically, there are provided a secondary-side suction pressure sensor 37 (corresponding to a sensor that detects a refrigerant pressure or a refrigerant temperature in the third flow path) that detects the pressure of the secondary-side refrigerant on the suction side of the secondary-side compressor 21, a secondary-side discharge pressure sensor 38 that detects the pressure of the secondary-side refrigerant on the discharge side of the secondary-side compressor 21, and a secondary-side discharge temperature sensor 39 that detects the temperature of the secondary-side refrigerant on the discharge side of the secondary-side compressor 21.

The heat source-side control unit 20 controls an operation of each of the parts 21(21a), 22, 36, 44, 46, and 47 of the heat source unit 2. The heat source-side control unit 20 includes a processor, such as a CPU or a microcomputer, and a memory provided to control the heat source unit 2, and is configured to be capable of exchanging control signals and the like with the primary-side control unit 70 of the primary-side unit 5, the utilization-side control units 50a, 50b, and 50c of the utilization units 3a, 3b, and 3c, and the branch units control units 60a to 60c.

(4) Control Unit

In the refrigeration cycle system 1, the heat source-side control unit 20, the utilization-side control units 50a to 50c, the branch unit control units 60a to 60c, and the primary-side control unit 70 described above are communicably connected to each other in a wired or wireless manner to constitute the control unit 80. Therefore, the control unit 80 controls an operation of each of the parts 21(21a), 22, 36, 44, 46, 47, 51a to 51c, 53a to 53c(54a to 54c), 66a to 66c, 67a to 67c, 71(71a), 72, 75(75a), and 76 on the basis of detection information from the various sensors 37, 38, 39, 77, 78, 58a, and the like, and instruction information and the like received from a non-illustrated remote controller and the like.

(5) Operation of Refrigeration Cycle System

Next, operations of the refrigeration cycle system 1 will be described with reference to FIGS. 4 to 8.

The refrigeration cycle operation of the refrigeration cycle system 1 can be mainly divided into a cooling operation, a heating operation, a cooling main operation, and a heating main operation.

Here, the cooling operation is a refrigeration cycle operation in which the utilization unit, performing an operation in which the utilization-side heat exchanger functions as an evaporator for the refrigerant, only exists, and the cascade heat exchanger 35 is allowed to function as a radiator for the secondary-side refrigerant with respect to the evaporation load of the whole of the utilization units.

The heating operation is a refrigeration cycle operation in which the utilization unit, performing an operation in which the utilization-side heat exchanger functions as a radiator for the refrigerant, only exists, and the cascade heat exchanger 35 is allowed to function as an evaporator for the secondary-side refrigerant with respect to the heat dissipation load of the whole of the utilization units.

The cooling main operation is an operation in which the utilization unit, performing an operation in which the utilization-side heat exchanger functions as an evaporator for the refrigerant and the utilization unit, performing an operation in which the utilization-side heat exchanger functions as a radiator for the refrigerant, are allowed to coexist. The cooling main operation is a refrigeration cycle operation in which when an evaporation load is main in the heat load of the whole of the utilization units, the cascade heat exchanger 35 is allowed to function as a radiator for the secondary-side refrigerant with respect to the evaporation load of the whole of the utilization units.

The heating main operation is an operation in which the utilization unit, performing an operation in which the utilization-side heat exchanger functions as an evaporator for the refrigerant, and the utilization unit, performing an operation in which the utilization-side heat exchanger functions as a radiator for the refrigerant, are allowed to coexist. The heating main operation is a refrigeration cycle operation in which when a heat dissipation load is main in the heat load of the whole of the utilization units, the cascade heat exchanger 35 is allowed to function as an evaporator for the secondary-side refrigerant with respect to the heat dissipation load of the whole of the utilization units.

Note that the operations of the refrigeration cycle system 1, including these refrigeration cycle operations, are performed by the above control unit 80.

Note that, in any of these operations, any one of the utilization units may be in an operation stop state. The utilization-side control units 50a to 50c, having received commands from a non-illustrated remote controller or the like, respectively controls the utilization units 3a to 3c to be in an operation stop state. In the operation stop state, the utilization units 3a to 3c close the utilization-side expansion valves 51a to 51c or close the first regulating valves 66a to 66c and the second regulating valves 67a to 67c, and stop the indoor fans 53a to 53c. As a result, the flows of the refrigerant in the utilization units 3a to 3c in the operation stop state are blocked.

(5-1) Cooling Operation

Figure 4:
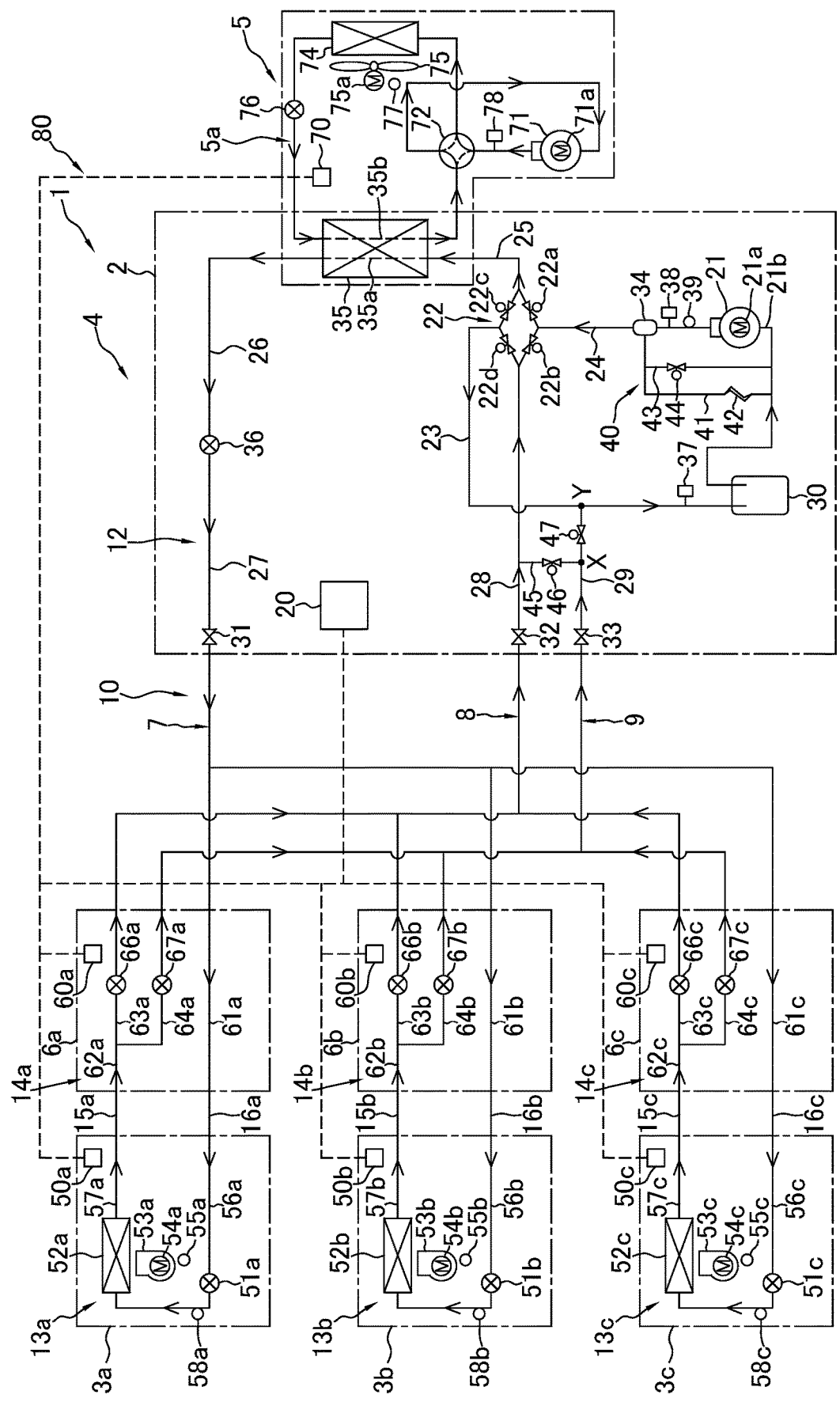
FIG. 4 is a view illustrating an operation (flow of a refrigerant) in a cooling operation of the refrigeration cycle system.

In the cooling operation, for example, an operation is performed in which all of the utilization-side heat exchangers 52a, 52b, and 52c of the utilization units 3a, 3b, and 3c function as evaporators for the refrigerant and the cascade heat exchanger 35 functions as a radiator for the secondary-side refrigerant. In this cooling operation, the primary-side refrigerant circuit 5a and the secondary-side refrigerant circuit 10 of the refrigeration cycle system 1 are configured as illustrated in FIG. 4. Note that the arrow attached to the primary-side refrigerant circuit 5a and the arrow attached to the secondary-side refrigerant circuit 10 of FIG. 4 indicate the flows of the refrigerant during the cooling operation.

Specifically, the primary-side unit 5 is configured such that the cascade heat exchanger 35 is allowed to function as an evaporator for the primary-side refrigerant by switching the primary-side switching mechanism 72 to the fifth connection state. Note that the fifth connection state of the primary-side switching mechanism 72 is a connection state indicated by the solid line in the primary-side switching mechanism 72 of FIG. 4. As a result, in the primary-side unit 5, the primary-side refrigerant discharged from the primary-side compressor 71 passes through the primary-side switching mechanism 72, and exchanges heat with the outside air supplied from the primary-side fan 75 in the primary-side heat exchanger 74. As a result, the primary-side refrigerant is condensed. The primary-side refrigerant condensed in the primary-side heat exchanger 74 is decompressed in the primary-side expansion valve 76, then flows through the primary-side flow path 35b of the cascade heat exchanger 35 and evaporates, and is sucked into the primary-side compressor 71 via the primary-side switching mechanism 72.

The heat source unit 2 is configured such that the cascade heat exchanger 35 is allowed to function as a radiator for the secondary-side refrigerant by switching the secondary-side switching mechanism 22 to the first connection state as well as the fourth connection state. Note that the first connection state of the secondary-side switching mechanism 22 is a connection state in which the first switching valve 22a is opened and the third switching valve 22c is closed. The fourth connection state of the secondary-side switching mechanism 22 is a connection state in which the fourth switching valve 22d is opened and the second switching valve 22b is closed. Here, the opening degree of the heat source-side expansion valve 36 is adjusted. In addition, the first on-off valve 46 and/or the second on-off valve 47 are controlled to be opened. In the first to third utilization units 3a to 3c, the first regulating valves 66a, 66b, and 66c and the second regulating valves 67a, 67b, and 67c are opened. As a result, all of the utilization-side heat exchangers 52a, 52b, and 52c of the utilization units 3a, 3b, and 3c function as evaporators for the refrigerant. In addition, all of the utilization-side heat exchangers 52a, 52b, and 52c of the utilization units 3a, 3b, and 3c and the suction side of the secondary-side compressor 21 of the heat source unit 2 are connected via the first utilization pipes 57a to 57c, the first connection pipes 15a to 15c, the merge pipes 62a to 62c, the first branch pipes 63a to 63c, the second branch pipes 64a to 64c, the first communication pipe 8, and the second communication pipe 9. In the utilization units 3a, 3b, and 3c, the opening degrees of the utilization-side expansion valves 51a, 51b, and 51c are adjusted. Note that, in the cooling operation, the plurality of utilization units 3a, 3b, and 3c may include the utilization unit in an operation stop state.

In the secondary-side refrigerant circuit 10 as described above, the secondary-side high-pressure refrigerant, compressed by the secondary-side compressor 21 and discharged, is sent to the secondary-side flow path 35a of the cascade heat exchanger 35 through the secondary-side switching mechanism 22. In the cascade heat exchanger 35, the secondary-side high-pressure refrigerant flowing through the secondary-side flow path 35a dissipates heat, and the primary-side refrigerant flowing through the primary-side flow path 35b of the cascade heat exchanger 35 evaporates. The secondary-side refrigerant, having dissipated heat in the cascade heat exchanger 35, passes through the heat source-side expansion valve 36 whose opening degree is adjusted, and then is sent to the third communication pipe 7 through the third shutoff valve 31.

The refrigerant sent to the third communication pipe 7 is branched into three, which pass through the third branch pipes 61a, 61b, and 61c of the first to third branch units 6a, 6b, and 6c. Thereafter, the refrigerants, having flowed through the respective second connection pipes 16a, 16b, and 16c, are sent to the second utilization pipes 56a, 56b, and 56c of the first to third utilization units 3a, 3b, and 3c. The refrigerants sent to the second utilization pipes 56a, 56b, and 56c are sent to the utilization-side expansion valves 51a, 51b, and 51c of the utilization units 3a, 3b, and 3c.

The refrigerants, having passed through the utilization-side expansion valves 51a, 51b, and 51c whose opening degrees are adjusted, exchange heat with the indoor air supplied by the indoor fans 53a, 53b, and 53c in the utilization-side heat exchangers 52a, 52b, and 52c. As a result, the refrigerants flowing through the utilization-side heat exchangers 52a, 52b, and 52c evaporate and become low-pressure gas refrigerants. The indoor air is cooled and supplied to the room. As a result, the room space is cooled. The low-pressure gas refrigerants, having evaporated in the utilization-side heat exchangers 52a, 52b, and 52c, flow through the first utilization pipes 57a to 57c, flow through the first connection pipes 15a to 15c, and then are sent to the merge pipes 62a, 62b, and 62c of the first to third utilization units 3a to 3c.

The low-pressure gas refrigerants sent to the merge pipes 62a, 62b, and 62c, branch into the first branch pipes 63a, 63b, and 63c and the second branch pipes 64a, 64b, and 64c and flow therethrough. The refrigerants, having passed through the first regulating valves 66a, 66b, and 66c in the first branch pipes 63a, 63b, and 63c, are sent to the first communication pipe 8. The refrigerants, having passed through the second regulating valves 67a, 67b, and 67c in the second branch pipes 64a, 64b, and 64c, are sent to the second communication pipe 9.

The low-pressure gas refrigerants sent to the first communication pipe 8 and the second communication pipe 9 are returned to the suction side of the secondary-side compressor 21 through the first shutoff valve 32, the second shutoff valve 33, the first heat source pipe 28, the second heat source pipe 29, one of the first on-off valve 46 and the second on-off valve 47 that is controlled to be opened, the secondary-side switching mechanism 22, the suction flow path 23, and the accumulator 30.

In this manner, operations in the cooling operation are performed.

(5-2) Heating Operation

In the heating operation, depending on a load of a space to be air-conditioned where the utilization-side heat exchangers 52a to 52c functioning as radiators for the secondary-side refrigerant are installed, a first heating operation that is the heating operation performed when the load is large and a second heating operation that is the heating operation performed when the load is small are selectively performed.

The load here is determined as the sum of the loads of the spaces to be air-conditioned where the respective utilization-side heat exchangers 52a to 52c, functioning as radiators for the secondary-side refrigerant, are installed. In the present embodiment, the load is obtained on the basis of the sum of the differences between the respective set temperatures of the utilization units 3a to 3c received by the utilization-side control units 50a to 50c via a non-illustrated remote controller and the like and the respective detected temperatures by indoor temperature sensors 55a to 55c. Specifically, it is to be determined that the load in the heating operation is larger as the indoor temperatures are lower than the set temperatures and as the differences are larger. When the load exceeds a predetermined level, the first heating operation is performed, and when the load does not exceed the predetermined level, the second heating operation is performed.

(5-2-1) First Heating Operation

Figure 5:
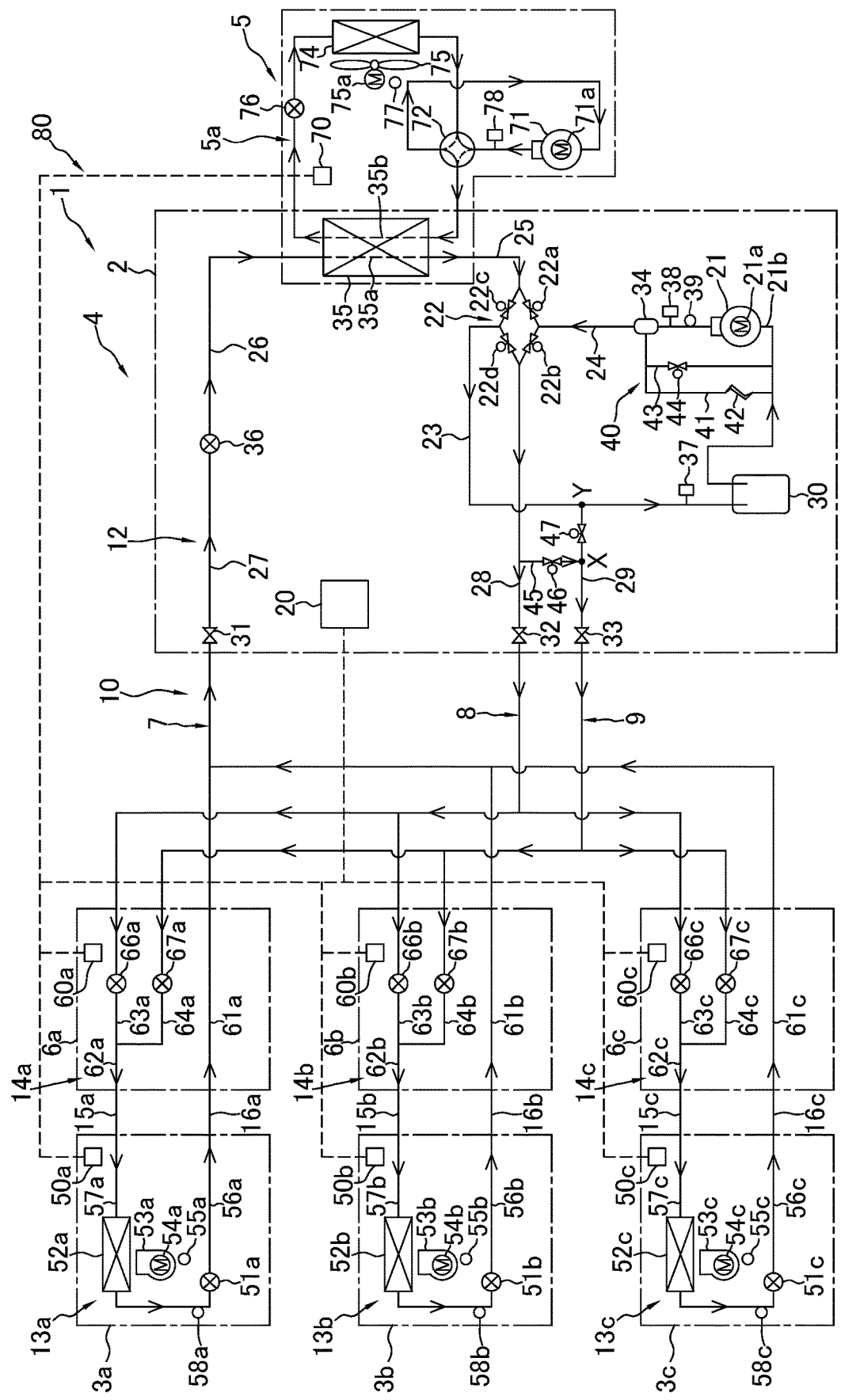
FIG. 5 is a view illustrating an operation (flow of the refrigerant) in a first heating operation of the refrigeration cycle system.

In the heating operation performed when the load is large, for example, an operation is performed in which all of the utilization-side heat exchangers 52a, 52b, and 52c of the utilization units 3a, 3b, and 3c function as radiators for the refrigerant. In the first heating operation, an operation is also performed in which the cascade heat exchanger 35 functions as an evaporator for the secondary-side refrigerant. In the first heating operation, the primary-side refrigerant circuit 5a and the secondary-side refrigerant circuit 10 of the refrigeration cycle system 1 are configured as illustrated in FIG. 5. The arrow attached to the primary-side refrigerant circuit 5a and the arrow attached to the secondary-side refrigerant circuit 10 of FIG. 5 indicate the flows of the refrigerant when the first heating operation is executed.

Specifically, the primary-side unit 5 is configured such that the cascade heat exchanger 35 is allowed to function as a radiator for the primary-side refrigerant by switching the primary-side switching mechanism 72 to a sixth operation state. The sixth operation state of the primary-side switching mechanism 72 is a connection state indicated by the broken line in the primary-side switching mechanism 72 of FIG. 5. As a result, in the primary-side unit 5, the primary-side refrigerant discharged from the primary-side compressor 71 passes through the primary-side switching mechanism 72, flows through the primary-side flow path 35b of the cascade heat exchanger 35, and is condensed. The primary-side refrigerant condensed in the cascade heat exchanger 35 is decompressed in the primary-side expansion valve 76, then evaporates by exchanging heat with the outside air supplied from the primary-side fan 75 in the primary-side heat exchanger 74, and is sucked into the primary-side compressor 71 via the primary-side switching mechanism 72.

The heat source unit 2 is also configured such that the cascade heat exchanger 35 is allowed to function as an evaporator for the secondary-side refrigerant by switching the secondary-side switching mechanism 22 to the second connection state as well as the third connection state. The second connection state of the secondary-side switching mechanism 22 is a connection state in which the first switching valve 22a is closed and the third switching valve 22c is opened. The third connection state of the secondary-side switching mechanism 22 is a connection state in which the second switching valve 22b is opened and the fourth switching valve 22d is closed. Here, in the heating operation performed when the load is large, the pressure of the refrigerant discharged from the secondary-side compressor 21 is controlled to exceed a predetermined pressure, and controlled to be, for example, 5 MPa or more and 12 MPa or less. The opening degree of the heat source-side expansion valve 36 is adjusted. In addition, the first on-off valve 46 is controlled to be opened, and the second on-off valve 47 is controlled to be closed. In the first to third branch units 6a to 6c, the first regulating valves 66a, 66b, and 66c and the second regulating valves 67a, 67b, and 67c are controlled to be opened. As a result, all of the utilization-side heat exchangers 52a, 52b, and 52c of the utilization units 3a, 3b, and 3c function as radiators for the refrigerant. In addition, all of the utilization-side heat exchangers 52a, 52b, and 52c of the utilization units 3a, 3b, and 3c and the discharge side of the secondary-side compressor 21 of the heat source unit 2 are connected via the discharge flow path 24, the first heat source pipe 28, the first communication pipe 8, the first branch pipes 63a to 63c, the connection path 45, the second heat source pipe 29, the second communication pipe 9, the second branch pipes 64a to 64c, the merge pipes 62a to 62c, the first connection pipes 15a to 15c, and the first utilization pipes 57a to 57c. The opening degrees of the utilization-side expansion valves 51a, 51b, and 51c of the utilization units 3a, 3b, and 3c are adjusted. Note that, in the first heating operation, the plurality of utilization units 3a, 3b, and 3c may include the utilization unit in an operation stop state.

In the secondary-side refrigerant circuit 10 as described above, the high-pressure refrigerant, compressed by the secondary-side compressor 21 and discharged, is sent to the first heat source pipe 28 through the second switching valve 22b controlled to be opened in the secondary-side switching mechanism 22. A part of the refrigerant sent to the first heat source pipe 28 is sent to the first communication pipe 8 through the first shutoff valve 32, and the rest is sent to the second communication pipe 9 through the first on-off valve 46, controlled to be open with the connection path 45, and the second heat source pipe 29. Since the second on-off valve 47 is controlled to be closed, the refrigerant does not flow from the second heat source pipe 29 to the suction flow path 23 via the second connection point Y.

The high-pressure refrigerant sent to the first communication pipe 8 is branched into three, which are sent to the first branch pipes 63a, 63b, and 63c of the first to third branch units 6a to 6c. The high-pressure refrigerants sent to the first branch pipes 63a, 63b, and 63c flow to the merge pipes 62a, 62b, and 62c through the first regulating valves 66a, 66b, and 66c. The high-pressure refrigerant sent to the second communication pipe 9 is branched into three, which are sent to the second branch pipes 64a, 64b, and 64c of the first to third branch units 6a to 6c. The high-pressure refrigerants sent to the second branch pipes 64a, 64b, and 64c flow to the merge pipes 62a, 62b, and 62c through the second regulating valves 67a, 67b, and 67c. The refrigerants, having passed through the first regulating valves 66a, 66b, and 66c, and the refrigerants, having passed through the second regulating valves 67a, 67b, and 67c, merge in the merge pipes 62a, 62b, and 62c, and are sent to the utilization-side heat exchangers 52a, 52b, and 52c of the utilization units 3a, 3b, and 3c.

The high-pressure refrigerants sent to the utilization-side heat exchangers 52a, 52b, and 52c exchange heat with the indoor air supplied by the indoor fans 53a, 53b, and 53c in the utilization-side heat exchangers 52a, 52b, and 52c. As a result, the refrigerants flowing through the utilization-side heat exchangers 52a, 52b, and 52c dissipate heat. The indoor air is heated and supplied to the room. As a result, the room space is heated. The refrigerants, having dissipated heat in the utilization-side heat exchangers 52a, 52b, and 52c, passes through the utilization-side expansion valves 51a, 51b, and 51c whose opening degrees are adjusted, and then are sent to the second utilization pipes 56a, 56b, and 56c of the respective first to third utilization units 3a, 3b, and 3c.

Then, the refrigerants sent to the respective second utilization pipes 56a, 56b, and 56c are sent to the third branch pipes 61a, 61b, and 61c of the respective branch units 6a, 6b, and 6c via the respective second connection pipes 16a, 16b, and 16c. The refrigerants, having flowed through the respective third branch pipes 61a, 61b, and 61c, are sent to the third communication pipe 7 to merge.

Then, the refrigerant sent to the third communication pipe 7 is sent to the heat source-side expansion valve 36 through the third shutoff valve 31. The refrigerant sent to the heat source-side expansion valve 36 passes through the heat source-side expansion valve 36 whose opening degree is adjusted. When having passed through the heat source-side expansion valve 36, the refrigerant is decompressed to the low pressure in the refrigeration cycle. Thereafter, in the cascade heat exchanger 35, the secondary-side refrigerant flowing through the secondary-side flow path 35a evaporates to become a low-pressure gas refrigerant, and is sent to the secondary-side switching mechanism 22. The primary-side refrigerant flowing through the primary-side flow path 35b of the cascade heat exchanger 35 is condensed. Then, the secondary-side low-pressure gas refrigerant sent to the secondary-side switching mechanism 22 is returned to the suction side of the secondary-side compressor 21 through the suction flow path 23 and the accumulator 30.

In this manner, operations in the first heating operation are performed.

(5-2-2) Second Heating Operation

The second heating operation is mainly different from the above first heating operation in that, in the heat source circuit 12, the first on-off valve 46 is controlled to be closed and the second on-off valve 47 is controlled to be opened.

Figure 6:
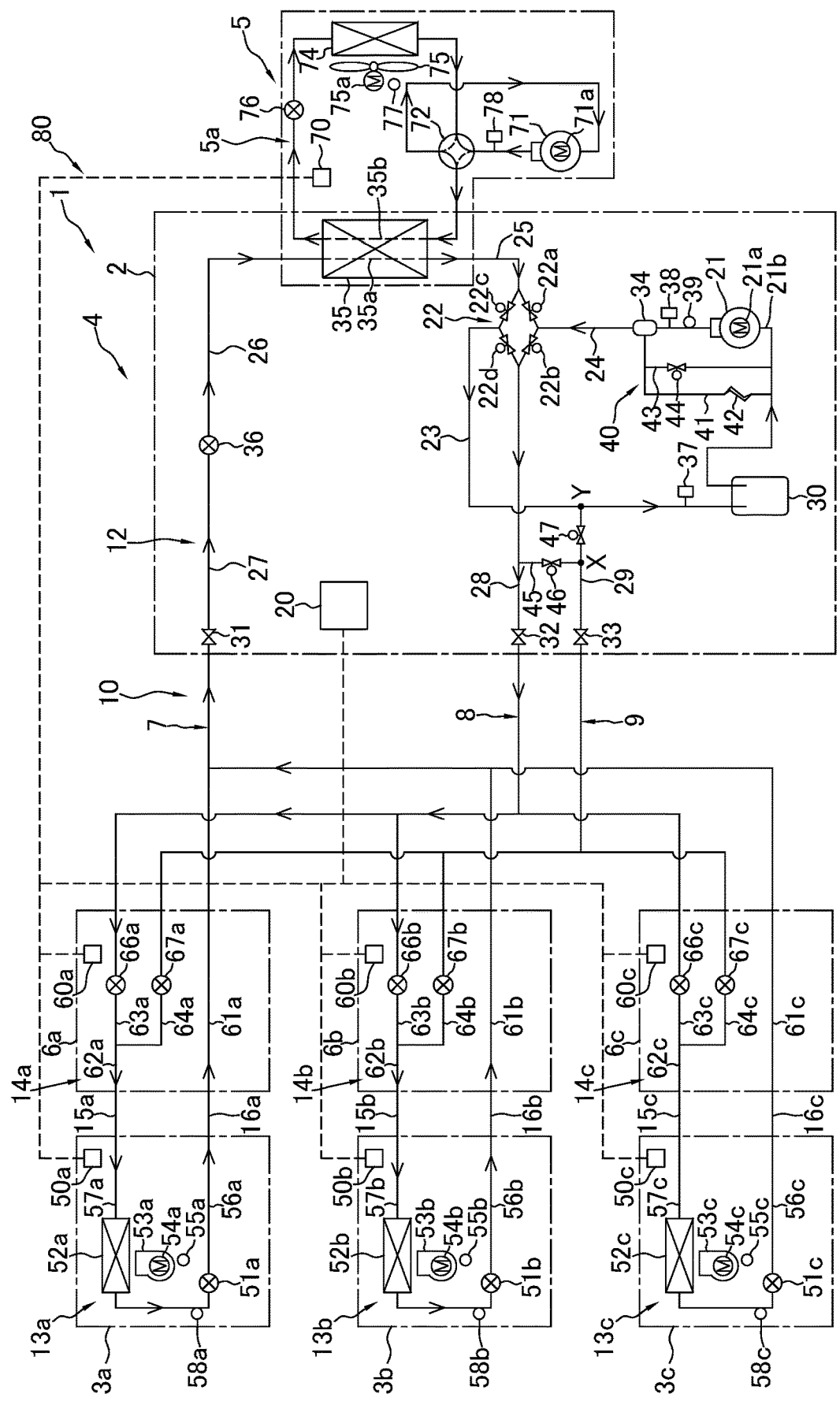
FIG. 6 is a view illustrating an operation (flow of the refrigerant) in a second heating operation of the refrigeration cycle system.

Hereinafter, the second heating operation will be described by taking, as an example, a case where the third utilization unit 3c is in an operation stop state, as illustrated in FIG. 6, and the sum of the loads in the first utilization unit 3a and the second utilization unit 3b does not exceed a predetermined level.

In this case, an operation is performed in which the utilization-side heat exchangers 52a and 52b of the utilization units 3a and 3b function as radiators for the refrigerant and the cascade heat exchanger 35 functions as an evaporator for the secondary-side refrigerant. In the second heating operation, the primary-side refrigerant circuit 5a and the secondary-side refrigerant circuit 10 of the refrigeration cycle system 1 are configured as illustrated in FIG. 6. The arrow attached to the primary-side refrigerant circuit 5a and the arrow attached to the secondary-side refrigerant circuit 10 of FIG. 6 indicate the flows of the refrigerant when the second heating operation is executed.

Specifically, the primary-side unit 5 is similar to that in the first heating operation.

In the heat source unit 2, the secondary-side switching mechanism 22 is switched to the second connection state as well as the third connection state, similarly to the first heating operation. As a result, it is configured that the cascade heat exchanger 35 is allowed to function as an evaporator for the secondary-side refrigerant. The second connection state of the secondary-side switching mechanism 22 is a connection state in which the first switching valve 22a is closed and the third switching valve 22c is opened.

The third connection state of the secondary-side switching mechanism 22 is a connection state in which the second switching valve 22b is opened and the fourth switching valve 22d is closed. The opening degree of the heat source-side expansion valve 36 is adjusted. In addition, the first on-off valve 46 is controlled to be closed and the second on-off valve 47 is controlled to be opened, unlike the first heating operation. In the branch units 6a and 6b, the first regulating valves 66a and 66b are controlled to be opened, and the second regulating valves 67a and 67b are controlled to be closed. As a result, the utilization-side heat exchangers 52a and 52b of the utilization units 3a and 3b function as radiators for the refrigerant. The utilization-side heat exchangers 52a and 52b of the utilization units 3a and 3b and the discharge side of the secondary-side compressor 21 of the heat source unit 2 are connected via the discharge flow path 24, the first heat source pipe 28, the first communication pipe 8, the first branch pipes 63a and 63b, the merge pipes 62a and 62b, the first connection pipes 15a and 15b, and the first utilization pipes 57a and 57b. In the utilization units 3a and 3b, the opening degrees of the utilization-side expansion valves 51a and 51b are adjusted. Note that, in the third branch unit 6c, the first regulating valve 66c is opened and the second regulating valve 67c is closed. The third utilization unit 3c is brought into an operation stop state by controlling the utilization-side expansion valve 51c to be closed.

In the secondary-side refrigerant circuit 10 as described above, the high-pressure refrigerant, compressed by the secondary-side compressor 21 and discharged, is sent to the first heat source pipe 28 through the second switching valve 22b controlled to be opened in the secondary-side switching mechanism 22. The refrigerant sent to the first heat source pipe 28 is sent to the first communication pipe 8 through the first shutoff valve 32. Since the first on-off valve 46 is controlled to be closed, the refrigerant flowing through the first heat source pipe 28 is not sent to the second heat source pipe 29 and the second communication pipe 9 via the connection path 45.

Then, the high-pressure refrigerant sent to the first communication pipe 8 is branched into two, which are sent to the first branch pipes 63a and 63b of the respective branch units 6a and 6b connected to the respective utilization units 3a and 3b that are the utilization units in operation. The high-pressure refrigerants sent to the first branch pipes 63a and 63b pass through the first regulating valves 66a and 66b, and flows through the merge pipes 62a and 62b. Thereafter, the refrigerants, having flowed through the first connection pipes 15a and 15b and the first utilization pipes 57a and 57b, are sent to the utilization-side heat exchangers 52a and 52b.

Then, the high-pressure refrigerants sent to the utilization-side heat exchangers 52a and 52b exchange heat with the indoor air supplied by the indoor fans 53a and 53b in the utilization-side heat exchangers 52a and 52b. As a result, the refrigerants flowing through the utilization-side heat exchangers 52a and 52b dissipate heat. The indoor air is heated and supplied to the room. As a result, the room space is heated. The refrigerants, having dissipated heat in the utilization-side heat exchangers 52a and 52b, flow through the second utilization pipes 56a and 56b and pass through the utilization-side expansion valves 51a and 51b whose opening degrees are adjusted. Thereafter, the refrigerants, having flowed through the second connection pipes 16a and 16b, flow through the third branch pipes 61a and 61b of the respective branch units 6a and 6b.

Then, the refrigerants sent to the third branch pipes 61a and 61b are sent to the third communication pipe 7 to merge. The subsequent flow of the refrigerant is similar to that in the first heating operation.

In this manner, operations in the second heating operation are performed.

(5-3) Cooling Main Operation

Figure 7:
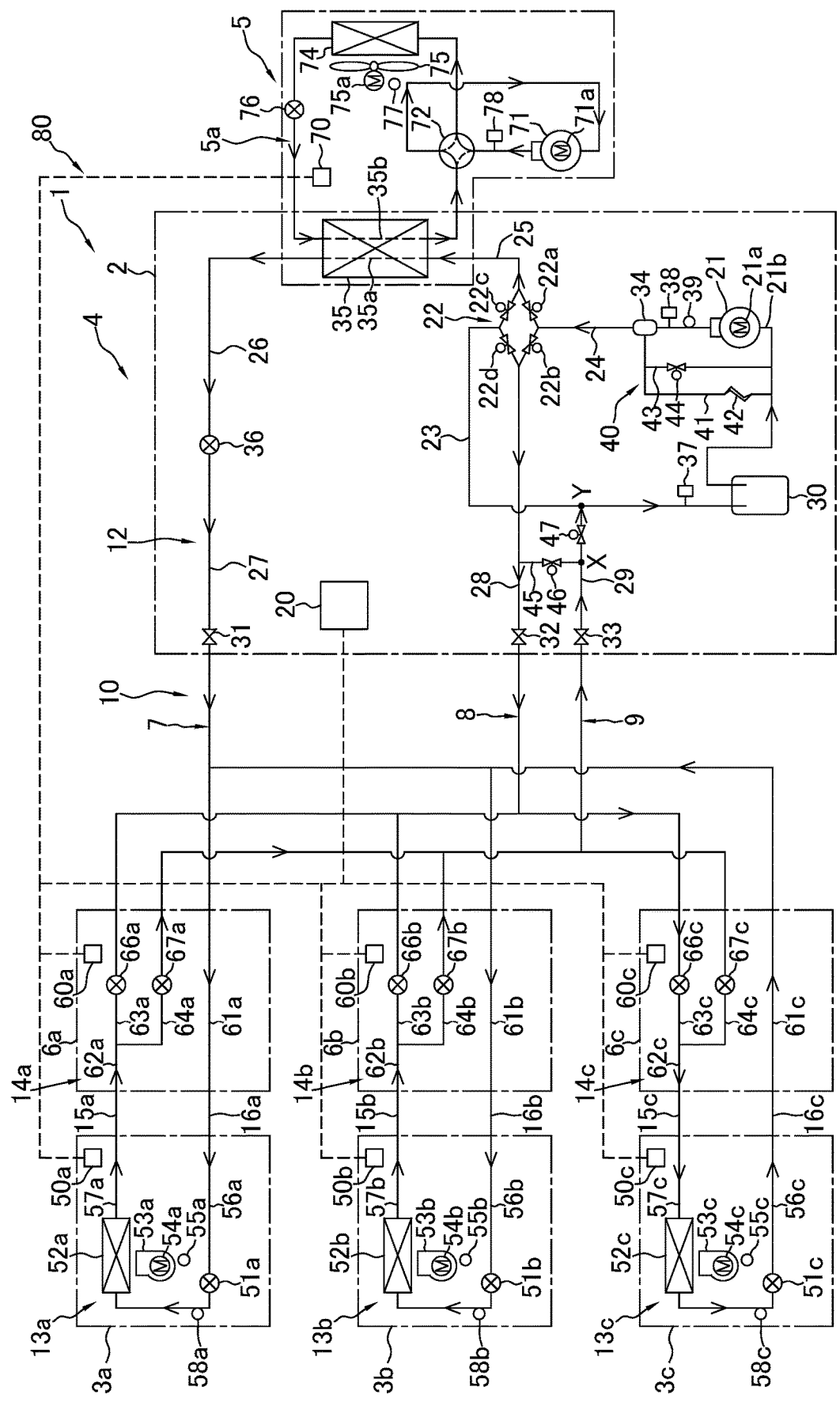
FIG. 7 is a view illustrating an operation (flow of the refrigerant) in a cooling main operation of the refrigeration cycle system.

In the cooling main operation, for example, an operation is performed in which the utilization-side heat exchangers 52a and 52b of the utilization units 3a and 3b function as evaporators for the refrigerant and the utilization-side heat exchanger 52c of the utilization unit 3c functions as a radiator for the refrigerant. In the cooling main operation, the cascade heat exchanger 35 functions as a radiator for the secondary-side refrigerant. In the cooling main operation, the primary-side refrigerant circuit 5a and the secondary-side refrigerant circuit 10 of the refrigeration cycle system 1 are configured as illustrated in FIG. 7. The arrow attached to the primary-side refrigerant circuit 5a and the arrow attached to the secondary-side refrigerant circuit 10 of FIG. 7 indicate the flows of the refrigerant during the cooling main operation.

Specifically, the primary-side unit 5 is configured such that the cascade heat exchanger 35 is allowed to function as an evaporator for the primary-side refrigerant by switching the primary-side switching mechanism 72 to the fifth connection state (the state indicated by the solid line of the primary-side switching mechanism 72 of FIG. 7). As a result, in the primary-side unit 5, the primary-side refrigerant discharged from the primary-side compressor 71 passes through the primary-side switching mechanism 72, and exchanges heat with the outside air supplied from the primary-side fan 75 in the primary-side heat exchanger 74. As a result, the primary-side refrigerant is condensed. The primary-side refrigerant condensed in the primary-side heat exchanger 74 is decompressed in the primary-side expansion valve 76, then flows through the primary-side flow path 35b of the cascade heat exchanger 35 and evaporates, and is sucked into the primary-side compressor 71 via the primary-side switching mechanism 72.

In addition, the heat source unit 2 is configured such that the cascade heat exchanger 35 is allowed to function as a radiator for the secondary-side refrigerant by switching the secondary-side switching mechanism 22 to the first connection state (the first switching valve 22a is opened and the third switching valve 22c is closed) as well as the third connection state (the second switching valve 22b is opened and the fourth switching valve 22d is closed). The opening degree of the heat source-side expansion valve 36 is adjusted. In addition, the first on-off valve 46 is controlled to be closed, and the second on-off valve 47 is controlled to be opened. In the first to third branch units 6a to 6c, the first regulating valve 66c and the second regulating valves 67a and 67b are controlled to be opened, and the first regulating valves 66a and 66b and the second regulating valve 67c are controlled to be closed. As a result, the utilization-side heat exchangers 52a and 52b of the utilization units 3a and 3b function as evaporators for the refrigerant, and the utilization-side heat exchanger 52c of the utilization unit 3c functions as a radiator for the refrigerant. The utilization-side heat exchangers 52a and 52b of the utilization units 3a and 3b and the suction side of the secondary-side compressor 21 of the heat source unit 2 are connected via the second communication pipe 9. In addition, the utilization-side heat exchangers 52c of the utilization unit 3c and the discharge side of the secondary-side compressor 21 of the heat source unit 2 are connected via the first communication pipe 8. In the utilization units 3a, 3b, and 3c, the opening degrees of the utilization-side expansion valves 51a, 51b, and 51c are adjusted. Note that, in the cooling main operation, the plurality of utilization units 3a, 3b, and 3c may include the utilization unit in an operation stop state.

In the secondary-side refrigerant circuit 10 as described above, a part of the secondary-side high-pressure refrigerant, compressed and discharged by the secondary-side compressor 21, is sent to the first communication pipe 8 through the secondary-side switching mechanism 22, the first heat source pipe 28, and the first shutoff valve 32, and the rest is sent to the secondary-side flow path 35a of the cascade heat exchanger 35 through the secondary-side switching mechanism 22 and the third heat source pipe 25. Since the first on-off valve 46 is controlled to be closed, the refrigerant flowing through the first heat source pipe 28 does not flow to the second heat source pipe 29 via the connection path 45.

Then, the high-pressure refrigerant sent to the first communication pipe 8 is sent to the first branch pipe 63c. The high-pressure refrigerant sent to the first branch pipe 63c is sent to the utilization-side heat exchanger 52c of the utilization unit 3c via the first regulating valve 66c and the merge pipe 62c.

Then, the high-pressure refrigerants sent to the utilization-side heat exchanger 52c exchange heat with the indoor air supplied by the indoor fan 53c in the utilization-side heat exchanger 52c. As a result, the refrigerant flowing through the utilization-side heat exchanger 52c dissipates heat. The indoor air is heated and supplied to the room, and the heating operation is performed by the utilization unit 3c. The refrigerant, having dissipated heat in the utilization-side heat exchanger 52c, flows through the second utilization pipe 56c, and the flow rate of the refrigerant is adjusted in the utilization-side expansion valve 51c. Thereafter, the refrigerant, having flowed through the second connection pipe 16c, is sent to the third branch pipe 61c of the branch unit 6c.

Then, the refrigerant sent to the third branch pipe 61c is sent to the third communication pipe 7.

The high-pressure refrigerant sent to the secondary-side flow path 35a of the cascade heat exchanger 35 exchanges heat with the primary-side refrigerant flowing through the primary-side flow path 35b in the cascade heat exchanger 35. As a result, the high-pressure refrigerant dissipates heat. After the flow rate of the secondary-side refrigerant, having dissipated heat in the cascade heat exchanger 35, is adjusted in the heat source-side expansion valve 36, the refrigerant is sent to the third communication pipe 7 through the third shutoff valve 31, and merges with the refrigerant having dissipated heat in the utilization-side heat exchanger 52c.

Then, the refrigerant, having merged in the third communication pipe 7, is branched into two, which are sent to the third branch pipes 61a and 61b of the branch units 6a and 6b. Thereafter, the refrigerants, having flowed through the second connection pipes 16a and 16b, are sent to the third branch pipes 61a and 61b of the respective first to second branch units 6a to 6b. The refrigerants sent to the third branch pipes 61a and 61b are sent to the utilization-side expansion valves 51a and 51b of the utilization units 3a and 3b.

Then, the refrigerants, having passed through the utilization-side expansion valves 51a and 51b whose opening degrees are adjusted, exchange heat with the indoor air supplied by the indoor fans 53a and 53b in the utilization-side heat exchangers 52a and 52b. As a result, the refrigerants flowing through the utilization-side heat exchangers 52a and 52b evaporate and become low-pressure gas refrigerants. The indoor air is cooled and supplied to the room, and the cooling operations are performed by the utilization units 3a and 3b. The low-pressure gas refrigerants, having evaporated in the utilization-side heat exchangers 52a and 52b, are sent to the merge pipes 62a and 62b of the first to second branch units 6a to 6b.

Then, the low-pressure gas refrigerants sent to the merge pipes 62a and 62b are sent to the second communication pipe 9 through the second regulating valves 67a and 67b and the second branch pipes 64a and 64b to merge.

Then, the low-pressure gas refrigerant sent to the second communication pipe 9 is returned to the suction side of the secondary-side compressor 21 through the second shutoff valve 33, the second heat source pipe 29, the suction flow path 23, and the accumulator 30. Since the second on-off valve 47 is controlled to be opened, the refrigerant flowing through the second heat source pipe 29 can flow to the suction flow path 23 via the second connection point Y.

In this manner, operations in the cooling main operation are performed.

(5-4) Heating Main Operation

Figure 8:
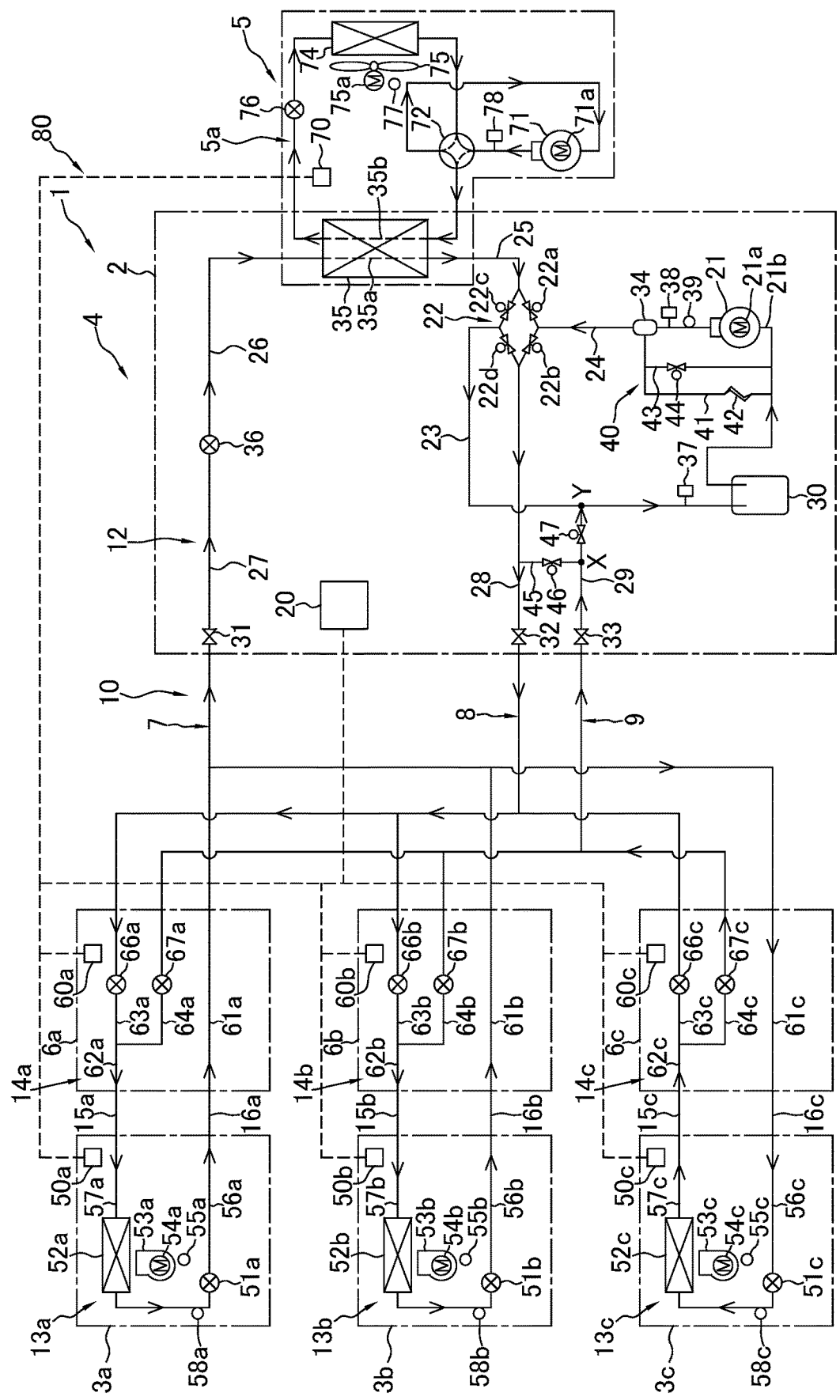
FIG. 8 is a view illustrating an operation (flow of the refrigerant) in a heating main operation of the refrigeration cycle system.

In the heating main operation, for example, an operation is performed in which the utilization-side heat exchangers 52a and 52b of the utilization units 3a and 3b function as radiators for the refrigerant and the utilization-side heat exchanger 52c functions as an evaporator for the refrigerant. In the heating main operation, the cascade heat exchanger 35 functions as an evaporator for the secondary-side refrigerant. In the heating main operation, the primary-side refrigerant circuit 5a and the secondary-side refrigerant circuit 10 of the refrigeration cycle system 1 are configured as illustrated in FIG. 8. The arrow attached to the primary-side refrigerant circuit 5a and the arrow attached to the secondary-side refrigerant circuit 10 of FIG. 8 indicate the flows of the refrigerant during the heating main operation.

Specifically, the primary-side unit 5 is configured such that the cascade heat exchanger 35 is allowed to function as a radiator for the primary-side refrigerant by switching the primary-side switching mechanism 72 to a sixth operation state. The sixth operation state of the primary-side switching mechanism 72 is a connection state indicated by the broken line in the primary-side switching mechanism 72 of FIG. 8. As a result, in the primary-side unit 5, the primary-side refrigerant discharged from the primary-side compressor 71 passes through the primary-side switching mechanism 72, flows through the primary-side flow path 35b of the cascade heat exchanger 35, and is condensed. The primary-side refrigerant condensed in the cascade heat exchanger 35 is decompressed in the primary-side expansion valve 76, then evaporates by exchanging heat with the outside air supplied from the primary-side fan 75 in the primary-side heat exchanger 74, and is sucked into the primary-side compressor 71 via the primary-side switching mechanism 72.

In the heat source unit 2, the secondary-side switching mechanism 22 is switched to the second connection state as well as the third connection state. The second connection state of the secondary-side switching mechanism 22 is a connection state in which the first switching valve 22a is closed and the third switching valve 22c is opened. The third connection state of the secondary-side switching mechanism 22 is a connection state in which the second switching valve 22b is opened and the fourth switching valve 22d is closed. As a result, it is configured that the cascade heat exchanger 35 is allowed to function as an evaporator for the secondary-side refrigerant. The opening degree of the heat source-side expansion valve 36 is adjusted. In addition, the first on-off valve 46 is controlled to be closed, and the second on-off valve 47 is controlled to be opened. In the first to third branch units 6a to 6c, the first regulating valves 66a and 66b and the second regulating valve 67c are controlled to be opened, and the first regulating valve 66c and the second regulating valves 67a and 67b are controlled to be closed. As a result, the utilization-side heat exchangers 52a and 52b of the utilization units 3a and 3b function as radiators for the refrigerant, and the utilization-side heat exchanger 52c of the utilization unit 3c functions as an evaporator for the refrigerant. The utilization-side heat exchanger 52c of the utilization unit 3c and the suction side of the secondary-side compressor 21 of the heat source unit 2 are connected via the first utilization pipe 57c, the first connection pipe 15c, the merge pipe 62c, the second branch pipe 64c, and the second communication pipe 9. In addition, the utilization-side heat exchangers 52a and 52b of the utilization units 3a and 3b and the discharge side of the secondary-side compressor 21 of the heat source unit 2 are connected via the discharge flow path 24, the first heat source pipe 28, the first communication pipe 8, the first branch pipes 63a and 63b, the merge pipes 62a and 62b, the first connection pipes 15a and 15b, and the first utilization pipes 57a and 57b. In the utilization units 3a, 3b, and 3c, the opening degrees of the utilization-side expansion valves 51a, 51b, and 51c are adjusted. Note that, in the heating main operation, the plurality of utilization units 3a, 3b, and 3c may include the utilization unit in an operation stop state.

In the secondary-side refrigerant circuit 10 as described above, the secondary-side high-pressure refrigerant, compressed and discharged by the secondary-side compressor 21, is sent to the first communication pipe 8 through the secondary-side switching mechanism 22, the first heat source pipe 28, and the first shutoff valve 32. Since the first on-off valve 46 is controlled to be closed, the refrigerant flowing through the first heat source pipe 28 does not flow to the second heat source pipe 29 via the connection path 45.

Then, the high-pressure refrigerant sent to the first communication pipe 8 is branched into two, which are sent to the first branch pipes 63a and 63b of the first branch unit 6a and the second branch unit 6b respectively connected to the respective first utilization unit 3a and second utilization unit 3b that are the utilization units in operation. The high-pressure refrigerants sent to the first branch pipes 63a and 63b are sent to the utilization-side heat exchangers 52a and 52b of the first utilization unit 3a and the second utilization unit 3b through the first regulating valves 66a and 66b and the merge pipes 62a and 62b.

Then, the high-pressure refrigerants sent to the utilization-side heat exchangers 52a and 52b exchange heat with the indoor air supplied by the indoor fans 53a and 53b in the utilization-side heat exchangers 52a and 52b. As a result, the refrigerants flowing through the utilization-side heat exchangers 52a and 52b dissipate heat. The indoor air is heated and supplied to the room. As a result, the room space is heated. The refrigerants, having dissipated heat in the utilization-side heat exchangers 52a and 52b, flow through the second utilization pipes 56a and 56b and pass through the utilization-side expansion valves 51a and 51b whose opening degrees are adjusted. Thereafter, the refrigerants, having flowed through the second connection pipes 16a and 16b, are sent to the third communication pipe 7 through the third branch pipes 61a and 61b of the branch units 6a and 6b.

Then, a part of the refrigerant sent to the third communication pipe 7 is sent to the third branch pipe 61c of the branch unit 6c, and the rest is sent to the heat source-side expansion valve 36 through the third shutoff valve 31.

Then, the refrigerant sent to the third branch pipe 61c flows through the second utilization pipe 56c of the utilization unit 3c via the second connection pipe 16c, and is sent to the utilization-side expansion valve 51c.

Then, the refrigerant, having passed through the utilization-side expansion valve 51c whose opening degree is adjusted, exchanges heat with the indoor air supplied by the indoor fan 53c in the utilization-side heat exchanger 52c. As a result, the refrigerant flowing through the utilization-side heat exchanger 52c evaporates and becomes a low-pressure gas refrigerant. The indoor air is cooled and supplied to the room. As a result, the room space is cooled. The low-pressure gas refrigerant, having evaporated in the utilization-side heat exchanger 52c, passes through the first utilization pipe 57c and the first connection pipe 15c, and is sent to the merge pipe 62c.

Then, the low-pressure gas refrigerant sent to the merge pipe 62c is sent to the second communication pipe 9 through the second regulating valve 67c and the second branch pipe 64c.

Then, the low-pressure gas refrigerant sent to the second communication pipe 9 is returned to the suction side of the secondary-side compressor 21 through the second shutoff valve 33, the second heat source pipe 29, the suction flow path 23, and the accumulator 30. Since the second on-off valve 47 is controlled to be opened, the refrigerant flowing through the second heat source pipe 29 can flow to the suction flow path 23 via the second connection point Y.

The refrigerant sent to the heat source-side expansion valve 36 passes through the heat source-side expansion valve 36 whose opening degree is adjusted, and then exchanges heat with the primary-side refrigerant flowing through the primary-side flow path 35b in the secondary-side flow path 35a of the cascade heat exchanger 35. As a result, the refrigerant flowing through the secondary-side flow path 35a of the cascade heat exchanger 35 evaporates and becomes a low-pressure gas refrigerant, which is sent to the secondary-side switching mechanism 22. The low-pressure gas refrigerant sent to the secondary-side switching mechanism 22 merges, in the suction flow path 23, with the low-pressure gas refrigerant having evaporated in the utilization-side heat exchanger 52c. The refrigerant having merged is returned to the suction side of the secondary-side compressor 21 via the accumulator 30.

In this manner, operations in the heating main operation are performed.

(6) Control During Heating Operation

Figure 9:
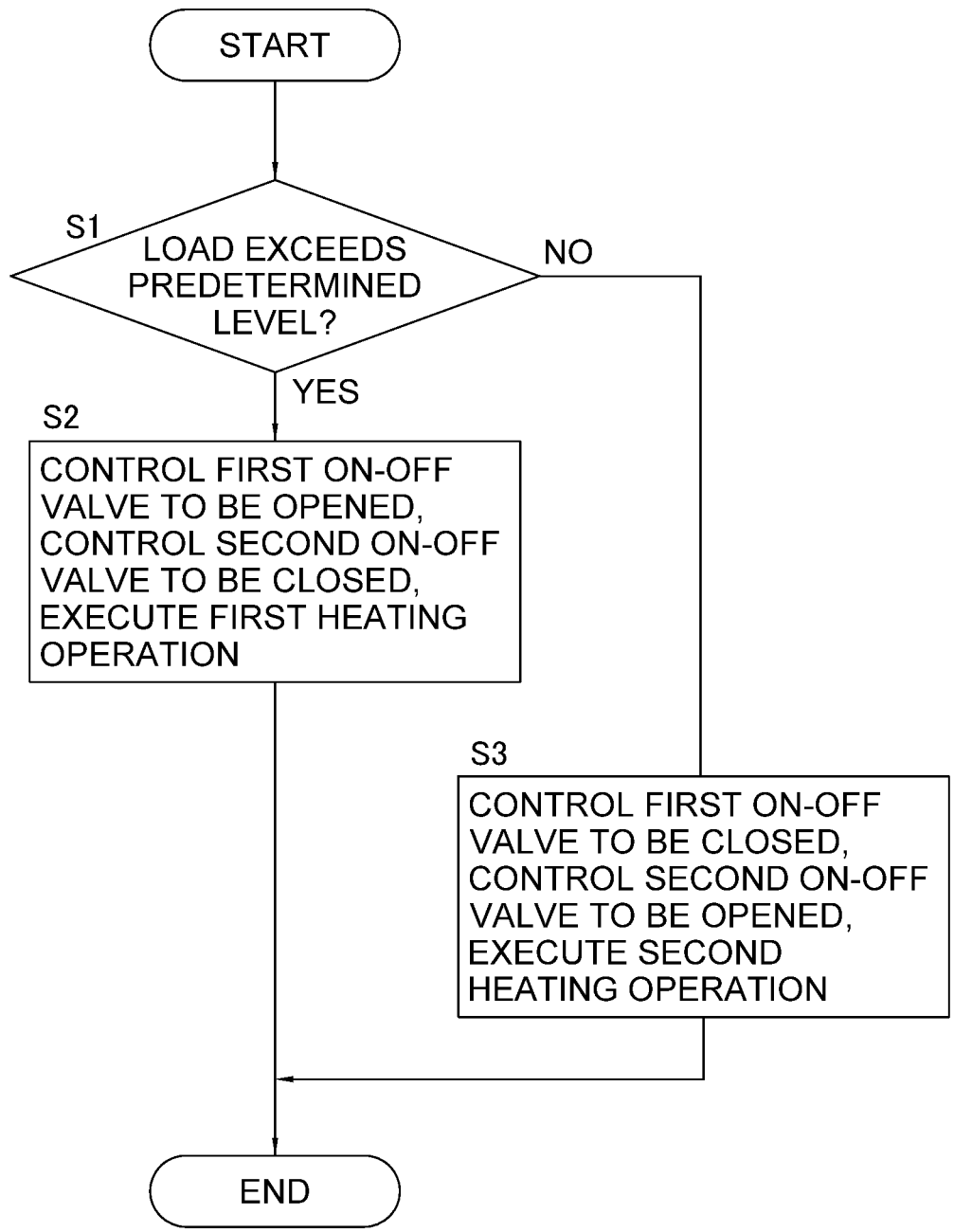
FIG. 9 is a control flowchart during a heating operation of the refrigeration cycle system.

Hereinafter, control during the heating operation of the refrigeration cycle system 1 will be described with reference to the flowchart of FIG. 9.

The control unit 80 determines in step S1 whether the sum of the loads of spaces to be air-conditioned, where the respective utilization-side heat exchangers 52a to 52c functioning as radiators for the secondary-side refrigerant are installed, exceeds a predetermined level. Here, when it is determined that the load exceeds the predetermined level, the process proceeds to step S2. When it is determined that the load does not exceed the predetermined level, the process proceeds to step S3.

In step S2, the control unit 80 executes the first heating operation that is a heating operation performed when the load is large. Specifically, the control unit 80 executes the first heating operation as described in the above (4-2-1) by: controlling the first on-off valve 46 to be opened and the second on-off valve 47 to be closed; and the like.

In step S3, the control unit 80 executes the second heating operation that is a heating operation performed when the load is small. Specifically, the control unit 80 executes the second heating operation as described in the above (4-2-2) by: controlling the first on-off valve 46 to be closed and the second on-off valve 47 to be opened; and the like.

(7) Characteristics of Embodiment

In the refrigeration cycle system 1 of the present embodiment, carbon dioxide is used as the refrigerant in the secondary-side refrigerant circuit 10. Therefore, the global warming potential (GWP) can be kept low. In addition, even if the refrigerant leaks on the utilization side, the refrigerant contains no chlorofluorocarbons, and thus chlorofluorocarbons do not flow out on the utilization side. In the refrigeration cycle system 1 of the present embodiment, the dual refrigeration cycle is adopted, so that it is possible to provide sufficient capacity in the secondary-side refrigerant circuit 10.

In the refrigeration cycle system 1 of the present embodiment described above, carbon dioxide is used as the refrigerant in the secondary-side refrigerant circuit 10. However, the carbon dioxide refrigerant tends to have a smaller difference in density between the high-pressure refrigerant and the low-pressure refrigerant in the refrigeration cycle than conventionally used refrigerants such as R32 and R410A, so that there are cases where it is difficult to supply a sufficient amount of the high-pressure refrigerant to the plurality of utilization-side heat exchangers 52a to 52c. In particular, when all of the plurality of utilization-side heat exchangers 52a to 52c function as radiators for the secondary-side refrigerant and when the load in them is large, a large amount of the high-pressure refrigerant is to be supplied to the plurality of utilization-side heat exchangers 52a to 52c in order to process the large load. Here, in the conventional three-tube refrigerant circuit using a high and low-pressure gas-refrigerant connection pipe, a low-pressure gas-refrigerant connection pipe, and a liquid-refrigerant connection pipe, the high-pressure refrigerant discharged from a compressor is conveyed, during a heating operation, to a plurality of utilization-side heat exchangers by using only the high and low-pressure gas-refrigerant connection pipe. Therefore, there are cases where it is difficult to send a sufficient amount of the refrigerant.

On the other hand, in the present embodiment, the high-pressure refrigerant discharged from the secondary-side compressor 21 is conveyed to the plurality of utilization-side heat exchangers 52a to 52c by using both the first communication pipe 8 and the second communication pipe 9. As a result, the high-pressure refrigerant discharged from the secondary-side compressor 21 is to flows via a larger flow path area, so that it is possible to send a sufficient amount of the refrigerant to the plurality of utilization-side heat exchangers 52a to 52c.

Alternatively, it can also be considered that a communication pipe having a large flow path area and a large inner diameter is used in order to send a sufficient amount of the high-pressure refrigerant to the plurality of utilization-side heat exchangers. However, as the inner diameter of the communication pipe is designed to be larger, the wall thickness of the communication pipe necessary for ensuring pressure resistance strength becomes larger. In particular, in the above embodiment in which a carbon dioxide refrigerant is used as the secondary-side refrigerant, the refrigerant is used at a relatively high pressure including a supercritical state, so that the wall thickness necessary for ensuring pressure resistance strength tends to be remarkable. In addition, as the wall thickness becomes larger, workability during installation becomes poorer and also the cost of the communication pipe itself becomes higher. From the above, it is more advantageous to convey the high-pressure refrigerant by using a plurality of communication pipes as in the above embodiment than by simply using a communication pipe having a large flow path area, because the above problems can be avoided.

In the present embodiment, the high-pressure refrigerant discharged from the secondary-side compressor 21 is sent to the plurality of utilization-side heat exchangers 52a to 52c via both the first communication pipe 8 and the second communication pipe 9. As a result, it is also possible to reduce the pressure loss received by the refrigerant to a smaller one than a case where the high-pressure refrigerant is sent to the plurality of utilization-side heat exchangers 52a to 52c via only the first communication pipe 8.

The second communication pipe 9 is not provided only for conveying the high-pressure refrigerant to the utilization-side heat exchangers 52a to 52c using the first communication pipe 8 and the second communication pipe 9, but is also used in other operations. Specifically, during the cooling operation, it is used as a flow path for returning the refrigerant, having evaporated in the plurality of utilization-side heat exchangers 52a to 52c, to the suction side of the secondary-side compressor 21. In addition, during the cooling main operation and the heating main operation, it is used as a flow path for returning the refrigerant, having evaporated in any utilization-side heat exchangers functioning as evaporators for the refrigerant among the plurality of utilization-side heat exchangers 52a to 52c, to the suction side of the secondary-side compressor 21. Therefore, by diverting the second communication pipe 9, it is possible to supply a sufficient amount of the high-pressure refrigerant to the plurality of utilization-side heat exchangers 52a to 52c during the heating operation without additionally providing another different communication pipe.

Also, in the present embodiment, when the refrigerant discharged from the secondary-side compressor 21 is sent to the plurality of utilization-side heat exchangers 52a to 52c and when not only the first communication pipe 8 but also both the first communication pipe 8 and the second communication pipe 9 are used, it is sufficient only to control the first on-off valve 46 provided in the connection path 45 to be opened.

Furthermore, in the present embodiment, when the refrigerant discharged from the secondary-side compressor 21 is sent to the plurality of utilization-side heat exchangers 52a to 52c using both the first communication pipe 8 and the second communication pipe 9, the second on-off valve 47 is controlled to be closed. Therefore, the refrigerant flowing through the second heat source pipe 29 can be prevented from returning to the secondary-side compressor 21 via the suction flow path 23.

Also, in the present embodiment, the connection path 45, connecting the first heat source pipe 28 connected to the first communication pipe 8 and the second heat source pipe 29 connected to the second communication pipe 9, is located in the secondary-side heat source casing 2x. Therefore, the length of each of the two flow paths, through which the refrigerant discharged from the secondary-side compressor 21 flows, can be more sufficiently secured than a case where, for example, the first communication pipe 8 and the second communication pipe 9 are connected near the utilization units 3a to 3c.

(8) Other Embodiments

(8-1) Another Embodiment A

In the above embodiment, a case has been described as an example, where the heat source circuit 12 includes the first heat source pipe 28, the second heat source pipe 29, the connection path 45, the first on-off valve 46, and the second on-off valve 47.

Figure 10:
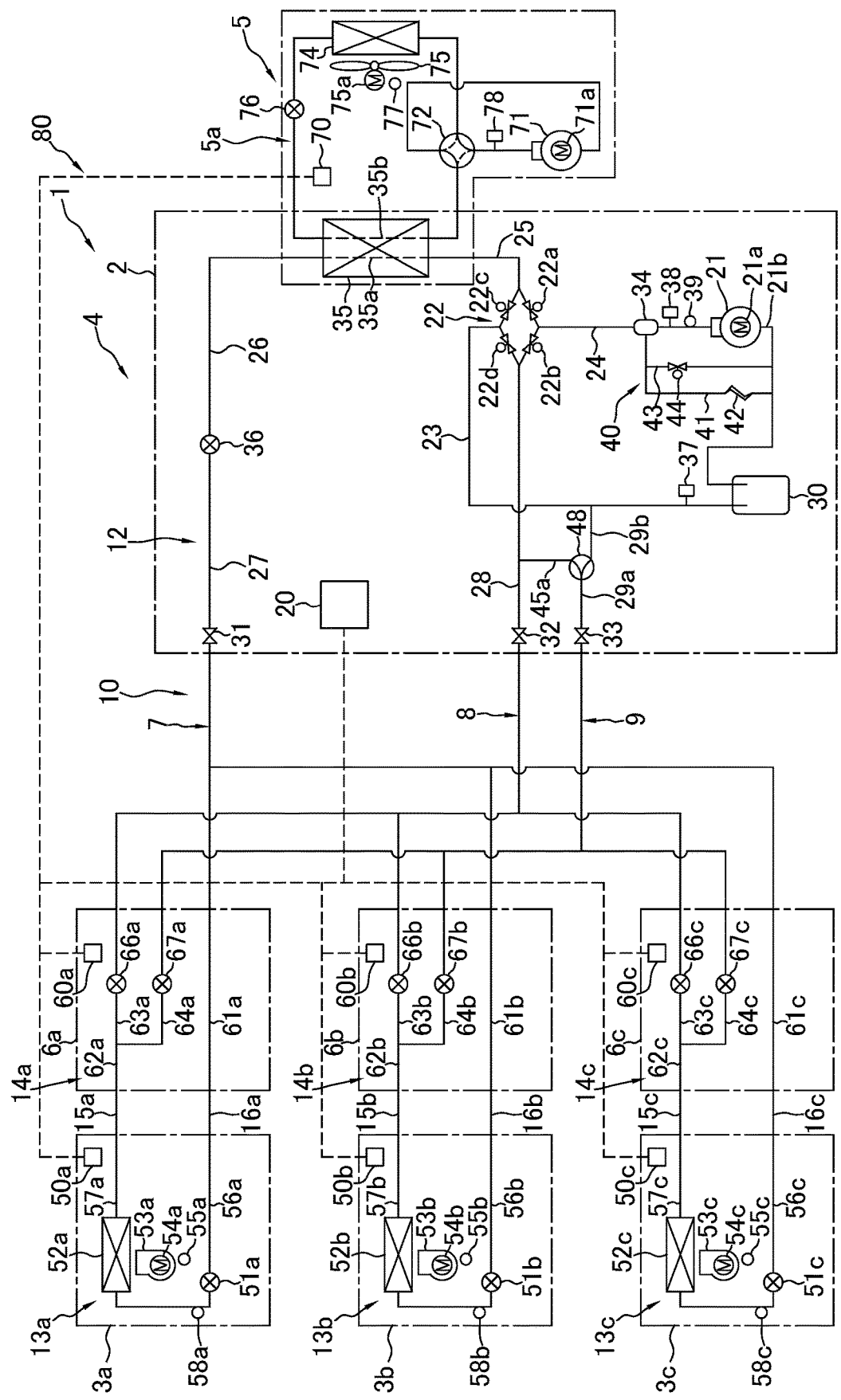
FIG. 10 is a schematic configuration view of a refrigeration cycle system according to another embodiment A.

On the other hand, for example, the heat source circuit 12 may be one including a sixth heat source pipe 29a, a seventh heat source pipe 29b, a communication path 45a, and a three-way valve 48, as illustrated in FIG. 10, instead of the second heat source pipe 29, the connection path 45, the first on-off valve 46, and the second on-off valve 47 in the above embodiment.

The sixth heat source pipe 29a is a refrigerant pipe extending from the second shutoff valve 33. The seventh heat source pipe 29b is a refrigerant pipe connected to the middle of the suction flow path 23. Specifically, the seventh heat source pipe 29b is connected between a portion, between the third switching valve 22c and the fourth switching valve 22d of the secondary-side switching mechanism 22, of the suction flow path 23 and the accumulator 30. The connection path 45a is connected to the middle of the first heat source pipe 28. The three-way valve 48 is a valve capable of switching between a state in which the sixth heat source pipe 29a is connected to the connection path 45a and a state in which the sixth heat source pipe 29a is connected to the seventh heat source pipe 29b.

In the above configuration, the control unit 80 controls the three-way valve 48 such that the sixth heat source pipe 29a and the seventh heat source pipe 29b are connected, in the cooling operation, the second heating operation, the cooling main operation, and the heating main operation in the above embodiment. In addition, the control unit 80 controls the three-way valve 48 such that the sixth heat source pipe 29a and the connection path 45a are connected, in the first heating operation in the above embodiment. As a result, it is possible to exert the same functional effects as those of the above embodiment.

(8-2) Another Embodiment B

In the above embodiment, a case has been described as an example, where when the heating operation is performed, a case where the high-pressure refrigerant is conveyed using only the first communication pipe 8 and a case where the high-pressure refrigerant is conveyed using both the first communication pipe 8 and the second communication pipe 9 are selectively executed depending on the magnitude of the load.

On the other hand, when the heating operation is performed, for example, the high-pressure refrigerant may be conveyed using both the first communication pipe 8 and the second communication pipe 9 regardless of the load.

(8-3) Another Embodiment C

In the above embodiment, a case has been described as an example, where, in the cascade heat exchanger 35, heat exchange is performed between the refrigerant flowing through the primary-side refrigerant circuit 5a and the refrigerant flowing through the secondary-side refrigerant circuit 10.

On the other hand, in the heat source circuit 12, an air heat exchanger may be used instead of the cascade heat exchanger 35. In this case, an outdoor fan that supplies outside air to the air heat exchanger can be used.

In addition, instead of the primary-side refrigerant circuit 5a that performs the vapor compression refrigeration cycle, a circulation circuit through which a heat medium, such as brine or water, circulates may be used to exchange heat between the secondary-side refrigerant and the heat medium in the cascade heat exchanger 35.

(8-4) Another Embodiment D

In the above embodiment, the secondary unit 4, including the heat source-side expansion valve 36 provided in the heat source unit 2, the utilization-side expansion valves 51a, 51b, and 51c provided in the utilization units 3a, 3b, and 3c, and the first regulating valves 66a, 66b, and 66c and second regulating valves 67a, 67b, and 67c provided in the branch units 6a, 6b, and 6c, has been described as an example.

Figure 11:
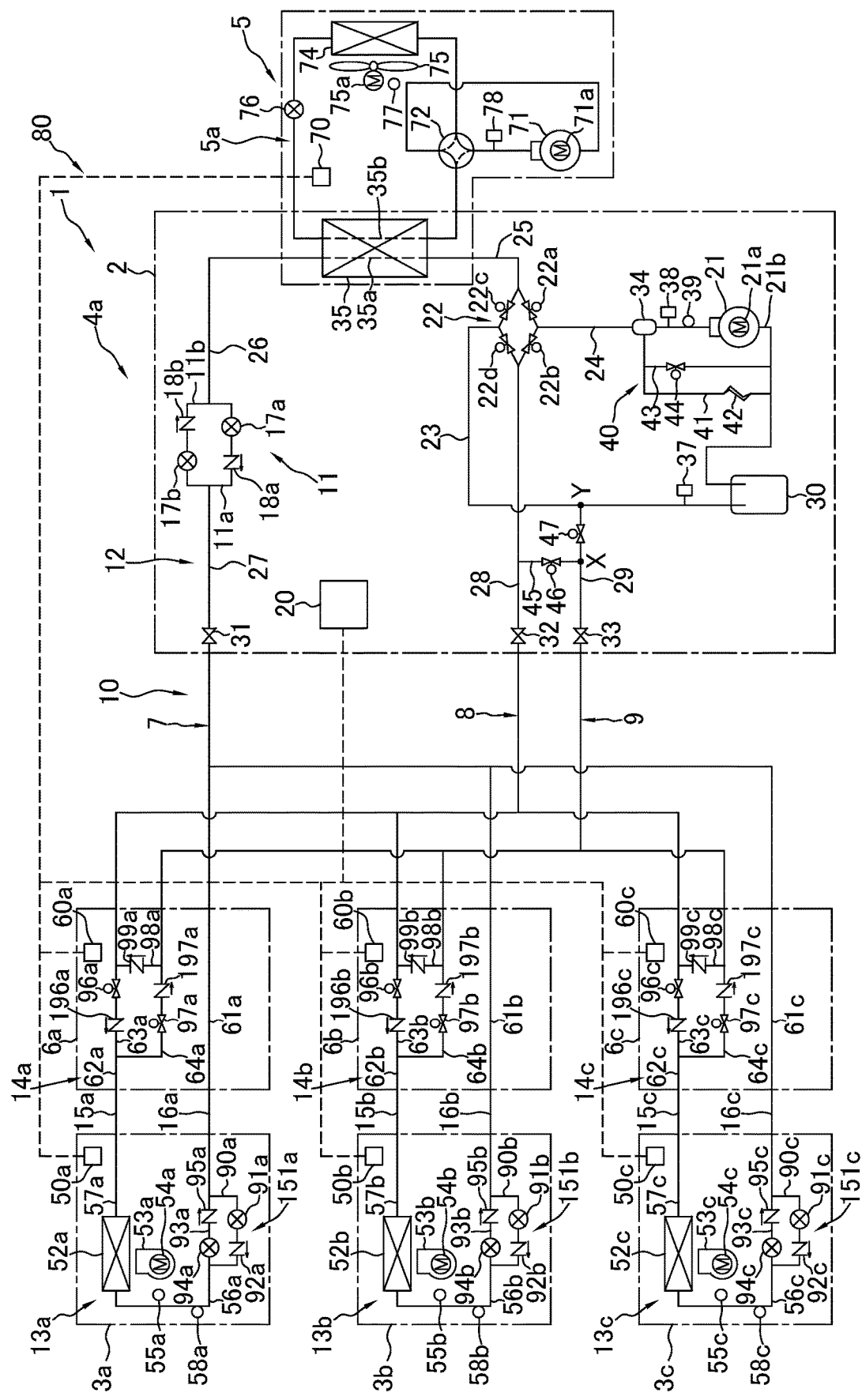
FIG. 11 is a schematic configuration view of a refrigeration cycle system according to another embodiment D.

On the other hand, the secondary-side unit 4 of the above embodiment may be configured, for example, like a secondary-side unit 4a (corresponding to a refrigeration cycle apparatus) illustrated in FIG. 11.

The secondary-side unit 4a is provided with, instead of the heat source-side expansion valve 36 of the above embodiment, a heat source-side expansion mechanism 11 in the heat source unit 2. The heat source-side expansion mechanism 11 is provided between the fourth heat source pipe 26 and the fifth heat source pipe 27. The heat source-side expansion mechanism 11 includes a first heat source-side branch flow path 11a and a second heat source-side branch flow path 11b that are flow paths disposed side by side in parallel to each other. In the first heat source-side branch flow path 11a, a first heat source-side expansion valve 17a and a first heat source-side check valve 18a are provided side by side. In the second heat source-side branch flow path 11b, a second heat source-side expansion valve 17b and a second heat source-side check valve 18b are provided side by side. Each of the first heat source-side expansion valve 17a and the second heat source-side expansion valve 17b is an electric expansion valve whose opening degree can be adjusted. The first heat source-side check valve 18a is a check valve that allows only a refrigerant flow, flowing from the fourth heat source pipe 26 toward the fifth heat source pipe 27, to pass through. The second heat source-side check valve 18b is a check valve that allows only a refrigerant flow, flowing from the fifth heat source pipe 27 toward the fourth heat source pipe 26, to pass through. In the above configuration, the opening degree of the first heat source-side expansion valve 17a is controlled when an operation is performed in which the refrigerant flows from the fourth heat source pipe 26 toward the fifth heat source pipe 27. The opening degree of the second heat source-side expansion valve 17b is controlled when the refrigerant flows from the fifth heat source pipe 27 toward the fourth heat source pipe 26. Specifically, the opening degree of the first heat source-side expansion valve 17a is controlled during the cooling operation and the cooling main operation, and the opening degree of the second heat source-side expansion valve 17b is controlled during the heating operation and the heating main operation. In the heat source-side expansion mechanism 11 described above, the first heat source-side check valve 18a is connected with respect to the first heat source-side expansion valve 17a, and the second heat source-side check valve 18b is connected with respect to the second heat source-side expansion valve 17b. Therefore, the flow direction of the refrigerant passing through the first heat source-side expansion valve 17a can be limited to one direction, and the flow direction of the refrigerant passing through the second heat source-side expansion valve 17b can also be limited to one direction. Therefore, even when it is difficult to secure an expansion valve whose opening degree can be controlled to a desired one in a situation where the refrigerant pressure is high or in a situation where the pressure difference between the high-pressure refrigerant and the low-pressure refrigerant is large, it is possible to more reliably obtain the same functional effects as the functional effects by the control of the heat source-side expansion valve 36 of the above embodiment.

Here, examples of the factors that ensure the control to a desired valve opening degree in a situation where the refrigerant pressure is high or in a situation where the pressure difference between the high-pressure refrigerant and the low-pressure refrigerant is large include the following. Specifically, when a carbon dioxide refrigerant is used as the refrigerant for the secondary-side refrigerant circuit 10, the carbon dioxide refrigerant is used in a state in which the pressure of the high-pressure refrigerant in the refrigeration cycle is higher than a case where a conventional refrigerant, such as R32 or R410A, is used. Here, there are many expansion valves, the opening and closing and the adjustment of the opening degree of each of which are performed by moving a needle with respect to a valve seat. If an expansion valve including such a needle is used in a situation where the refrigerant flows in a direction opposite to the direction in which the needle is moved when the valve is closed or the valve opening degree is narrowed, the tip of the needle is to receive the pressure of the refrigerant. In this case, the movement of the needle is more suppressed as the refrigerant pressure acting on the tip of the needle is higher. As a result, it may be difficult to adjust the valve opening degree to a desired one. In particular, when the expansion valve is used in a direction in which the high-pressure refrigerant acts on the tip side of the needle, and when the difference in refrigerant pressure between before and after the expansion valve is large, the opening degree of the valve cannot be properly closed even if it is attempted to control the expansion valve to a fully closed state. As a result, there is a risk that the refrigerant may pass between the needle and the valve seat to cause a leak of the refrigerant. In addition, when it is attempted to control the expansion valve to have a desired low opening degree, the expansion valve cannot be controlled to have an intended valve opening degree. As a result, there is a risk that the valve may open more than the desired low opening degree. As described above, in a situation where the refrigerant pressure is high or in a situation where the pressure difference between the high-pressure refrigerant and the low-pressure refrigerant is large, it may be difficult to control the expansion valve to an intended state. On the other hand, when the above heat source-side expansion mechanism 11 is adopted, the above problem can be solved.

The secondary-side unit 4a is provided with, instead of the utilization-side expansion valves 51a, 51b, and 51c, utilization-side expansion mechanisms 151a, 151b, and 151c in the utilization units 3a, 3b, and 3c of the above embodiment. Hereinafter, the first utilization-side expansion mechanism 151a will be described. For the configurations of the second utilization-side expansion mechanism 151b and the third utilization-side expansion mechanism 151c, description of each part will be omitted by adding a subscript "b" or "c" instead of a subscript "a" that is a reference signal indicating the each part of the first utilization-side expansion mechanism 151a. The first utilization-side expansion mechanism 151a is provided in the middle of the second utilization pipe 56a. The first utilization-side expansion mechanism 151a includes a first utilization-side branch flow path 90a and a second utilization-side branch flow path 93a that are flow paths disposed side by side in parallel to each other. In the first utilization-side branch flow path 90a, a first utilization-side expansion valve 91a and a first utilization-side check valve 92a are provided side by side. In the second utilization-side branch flow path 93a, a second utilization-side expansion valve 94a and a second utilization-side check valve 95a are provided side by side. Each of the first utilization-side expansion valve 91a and the second utilization-side expansion valve 94a is an electric expansion valve whose opening degree can be adjusted. The first utilization-side check valve 92a is a check valve that allows only a refrigerant flow, flowing from the second connection pipe 16a side toward the utilization-side heat exchanger 52a side, to pass through. The second utilization-side check valve 95a is a check valve that allows only a refrigerant flow, flowing from the utilization-side heat exchanger 52a side toward the second connection pipe 16a side, to pass through. In the above configuration, the opening degree of the first utilization-side expansion valve 91a is controlled when an operation is performed in which the refrigerant flows from the second connection pipe 16a side toward the utilization-side heat exchanger 52a side, and the opening degree of the second utilization-side expansion valve 94a is controlled when the refrigerant flows from the utilization-side heat exchanger 52a side toward the second connection pipe 16a side. Specifically, the opening degree of the first utilization-side expansion valve 91a is controlled: during the cooling operation; when the utilization-side heat exchanger 52a functions as an evaporator for the refrigerant during the cooling main operation; and when the utilization-side heat exchanger 52a functions as an evaporator for the refrigerant during the heating main operation. The opening degree of the second utilization-side expansion valve 94a is controlled: during the heating operation; when the utilization-side heat exchanger 52a functions as a radiator for the refrigerant during the cooling main operation; and when the utilization-side heat exchanger 52a functions as a radiator for the refrigerant during the heating main operation. In the first utilization-side expansion mechanism 151a described above, the first utilization-side check valve 92a is connected to the first utilization-side expansion valve 91a, and the second utilization-side check valve 95a is connected to the second utilization-side expansion valve 94a. Therefore, the flow direction of the refrigerant passing through the first utilization-side expansion valve 91a can be limited to one direction, and the flow direction of the refrigerant passing through the second utilization-side expansion valve 94a can also be limited to one direction. Accordingly, even when it is difficult to secure an expansion valve whose opening degree can be controlled to a desired one in a situation where the refrigerant pressure is high or in a situation where the pressure difference between the high-pressure refrigerant and the low-pressure refrigerant is large, it is possible to more reliably obtain the same functional effects as the functional effects by the control of the utilization-side expansion valve 51a of the above embodiment. Note that the same applies to the second utilization-side expansion mechanism 151b and the third utilization-side expansion mechanism 151c.

The secondary-side unit 4a is provided with, instead of the first regulating valves 66a, 66b, and 66c, first regulating valves 96a, 96b, and 96c and first check valves 196a, 196b, and 196c, and provided with, instead of the second regulating valves 67a, 67b, and 67c, second regulating valves 97a, 97*b*, and 97*c* and second check valves 197*a*, 197*b*, and 197*c*, in the branch units 6*a*, 6*b*, and 6*c* of the above embodiment. The secondary-side unit 4*a* further includes, in the branch units 6*a*, 6*b*, and 6*c*, connection flow paths 98*a*, 98*b*, and 98*c* that connect the first branch pipes 63*a*, 63*b*, and 63*c* and the second branch pipes 64*a*, 64*b*, and 64*c*. The connection flow paths 98*a*, 98*b*, and 98*c* are provided with check valves 99*a*, 99*b*, and 99*c*. Hereinafter, the first regulating valve 96*a*, the second regulating valve 97*a*, the connection flow path 98*a*, and the check valve 99*a* provided in the first branch unit 6*a* will be described. However, for the corresponding configurations of the second branch unit 6*b* and the third branch unit 6*c*, description of each part will be omitted by adding a subscript "b" or "c" instead of a subscript "a" that is a reference signal indicating the each part. In the first branch pipe 63*a*, the first regulating valve 96*a* and the first check valve 196*a* are provided side by side. In the second branch pipe 64*a*, the second regulating valve 97*a* and the second check valve 197*a* are provided side by side. Each the first regulating valve 96*a* and the second regulating valve 97*a* is an electromagnetic valve that can be switched between an opened state and a closed state. The first check valve 196*a* is a check valve that allows only a refrigerant flow, flowing from the first communication pipe 8 toward the merge pipe 62*a*, to pass through. The second check valve 197*a* is a check valve that allows only a refrigerant flow, flowing from the merge pipe 62*a* toward the second communication pipe 9, to pass through. The connection flow path 98*a* connects a portion, closer to the first communication pipe 8 side than to the first regulating valve 96*a* and the first check valve 196*a*, of the first branch pipe 63*a* and a portion, closer to the second communication pipe 9 side than to the second regulating valve 97*a* and the second check valve 197*a*, of the second branch pipe 64*a*. The check valve 99*a* allows only a refrigerant flow from the second branch pipe 64*a* toward the first branch pipe 63*a*. In the above configuration, during the cooling operation, the second regulating valve 97*a* is controlled to be opened and the first regulating valve 96*a* is controlled to be closed. As a result, a part of the refrigerant, having evaporated in the utilization-side heat exchanger 52*a* and having passed through the second regulating valve 97*a* of the second branch pipe 64*a*, flows through the second communication pipe 9, and a part of the rest passes through the check valve 99*a* of the connection flow path 98*a* and flows to the first communication pipe 8. During the heating operation, the first regulating valve 96*a* is controlled to be opened and the second regulating valve 97*a* is controlled to be closed. As a result, during the first heating operation, the refrigerant, having flowed through the first communication pipe 8, and the refrigerant, having flowed through the second communication pipe 9 and having passed through the check valve 99*a* of the connection flow path 98*a*, merge and flow so as to pass through the first regulating valve 96*a*. Note that, during the second heating operation, the refrigerant, having flowed through the first communication pipe 8, flows so as to pass through the first regulating valve 96*a*. When the utilization-side heat exchanger 52*a* functions as an evaporator for the refrigerant during the cooling main operation and the heating main operation, the first regulating valve 96*a* is controlled to be closed and the second regulating valve 97*a* is controlled to be opened. As a result, the refrigerant, having evaporated in the utilization-side heat exchanger 52*a*, passes through the second regulating valve 97*a* of the second branch pipe 64*a* and flows to the second communication pipe 9. When the utilization-side heat exchanger 52*a* functions as a radiator for the refrigerant during the cooling main operation and the heating main operation, the first regulating valve 96*a* is controlled to be opened and the second regulating valve 97*a* is controlled to be closed. As a result, the refrigerant, having flowed through the first communication pipe 8, is allowed to pass through the first regulating valve 96*a* of the first branch pipe 63*a* and is sent to the utilization-side heat exchanger 52*a*. Note that each of the first regulating valve 96*a* and the second regulating valve 97*a* is an electromagnetic valve including a needle that moves with respect to a valve seat. So, there can be the same problem as the above problem that it is difficult to control the valve to an intended state as mentioned above. On the other hand, according to the configuration in which the first regulating valve 96*a* and the first check valve 196*a*, and the second regulating valve 97*a* and the second check valve 197*a* are provided in parallel to each other, the flow direction of the refrigerant passing through the first regulating valve 96*a* can be limited to one direction, and the flow direction of the refrigerant passing through the second regulating valve 97*a* can also be limited to one direction, as described above. Therefore, even when it is difficult to secure an electromagnetic valve whose opening degree can be controlled to a desired closed state in a situation where the refrigerant pressure is high or in a situation where the pressure difference between the high-pressure refrigerant and the low-pressure refrigerant is large, it is possible to more reliably obtain the same functional effects as the functional effects by the control of the first regulating valve 66*a* and the second regulating valve 67*a* of the above embodiment. Note that the same applies to a configuration in which the first regulating valve 96*b* and the first check valve 196*b*, and the second regulating valve 97*b* and the second check valve 197*b* are provided in parallel to each other, and a configuration in which the first regulating valve 96*c* and the first check valve 196*c*, and the second regulating valve 97*c* and the second check valve 197*c* are provided in parallel to each other.

Note that, in the first branch unit 6*a*, each of the first regulating valve 96*a* and the second regulating valve 97*a* may be an electric expansion valve whose opening degree can be adjusted, instead of an electromagnetic valve. Specifically, a configuration may be adopted in which the first regulating valve 96*a*, which is an electric expansion valve, and the first check valve 196*a*, and the second regulating valve 97*a*, which is an electric expansion valve, and the second check valve 197*a* are provided in parallel to each other. The same applies to the second branch unit 6*b* and the third branch unit 6*c*.

As described above, the secondary-side unit 4*a* can also perform the same operations as those of the secondary-side unit 4 of the above embodiment.

Note that providing the heat source-side expansion mechanism 11 instead of the heat source-side expansion valve 36 of the above embodiment, providing the utilization-side expansion mechanisms 151*a*, 151*b*, and 151*c* instead of the utilization-side expansion valves Ma, Mb, and Mc, and providing the connection flow paths 98*a*, 98*b*, and 98*c* and the check valves 99*a*, 99*b*, and 99*c* while providing the first regulating valves 96*a*, 96*b*, and 96*c* and the first check valves 196*a*, 196*b*, and 196*c* instead of the first regulating valves 66*a*, 66*b*, and 66*c* and while providing the second regulating valves 97*a*, 97*b*, and 97*c* and the second check valves 197*a*, 197*b*, and 197*c* instead of the second regulating valves 67*a*, 67*b*, and 67*c*, are matters independent of each other. Therefore, an embodiment in which these are appropriately combined may be adopted.

Note that, even in the secondary-side unit 4*a* including both the utilization units 3*a* to 3*c* in which the utilization-side expansion mechanisms 151a to 151c are provided, and the branch units 6a to 6c in which the first regulating valves 96a to 96c and the first check valves 196a to 196c, and the second regulating valves 97a to 97c and the second check valves 197a to 197c are provided in parallel, the utilization unit in an operation stop state may be included during the various operations, similarly to the above embodiment. In this case, for example, when the utilization units 3a to 3c, including the utilization-side heat exchangers 52a to 52c that function as evaporators for the refrigerant, are brought into operation stop states, the utilization-side expansion mechanisms 151a to 151c included in the utilization units 3a to 3c brought into the operation stop states are controlled to be closed. More specifically, the first utilization-side expansion valves 91a to 91c included in the utilization units 3a to 3c brought into operation stop states are controlled to be closed. When the utilization units 3a to 3c, including the utilization-side heat exchangers 52a to 52c that function as radiators for the refrigerant, are brought into operation stop states, the utilization units 3a to 3c are controlled by, for example, either a control pattern 1 or a control pattern 2. In the control pattern 1, the first utilization-side expansion valves 91a to 91c and the second utilization-side expansion valves 94a to 94c of the utilization-side expansion mechanisms 151a to 151c included in the utilization units 3a to 3c brought into operation stop states are controlled to be closed, and the first regulating valves 96a to 96c included in the branch units 6a to 6c connected corresponding to the utilization units 3a to 3c brought into operation stop states are controlled to be closed. In the control pattern 2, the second utilization-side expansion valves 94a to 94c of the utilization-side expansion mechanisms 151a to 151c included in the utilization units 3a to 3c brought into operation stop states are controlled to have a predetermined low opening degree, and the first regulating valves 96a to 96c included in the branch units 6a to 6c connected corresponding to the utilization units 3a to 3c brought into operation stop states are controlled to be opened.

(8-5) Another Embodiment E

In the above embodiment, the case, where the second on-off valve 47 is provided in the second heat source pipe 29, has been described.

On the other hand, the second heat source pipe 29 may be provided with, instead of the second on-off valve 47, a check valve that allows only a refrigerant flow from the second connection point Y, where the second heat source pipe and the suction flow path 23 are connected, toward the first connection point X where the second heat source pipe 29 and the connection path 45 are connected, and does not allow a refrigerant flow from the first connection point X, where the second heat source pipe 29 and the communication path 45 are connected, toward the second connection point Y where the second heat source pipe 29 and the suction flow path 23 are connected.

(8-6) Another Embodiment F

In the above embodiment, a case has been described as an example, where the connection path 45, connecting the first heat source pipe 28 connected to the first communication pipe 8 and the second heat source pipe 29 connected to the second communication pipe 9, is provided in the secondary-side heat source casing 2x.

On the other hand, instead of the connection path 45 provided in the secondary-side heat source casing 2x in the above embodiment, a connection path that connects the first communication pipe 8 and the second communication pipe 9 may be used outside the secondary-side heat source casing 2x.

In addition, the above embodiment may be changed to a configuration described below. Specifically, the first shutoff valve 32 interposed between the first heat source pipe 28 and the first communication pipe 8 of the above embodiment and the second shutoff valve 33 interposed between the second heat source pipe 29 and the second communication pipe 9 thereof are disposed outside the secondary-side heat source casing 2x. And, instead of the connection path 45 provided in the secondary-side heat source casing 2x in the above embodiment, a connection path that connects a portion of the first heat source pipe 28 and a portion of the second heat source pipe 29, the portions being located outside the secondary-side heat source casing 2x, is used.

Also, in the above configuration, the length of each of two flow paths, through which the refrigerant discharged from the secondary-side compressor 21 flows during the first heating operation, can be sufficiently secured, similarly to the above embodiment.

(8-7) Another Embodiment G

In the above embodiment, a case has been described where the sum of the differences between the respective set temperatures of the utilization units 3a to 3c and the respective detected temperatures of the indoor temperature sensors 55a to 55c is used as the load.

On the other hand, the load is not limited, and for example, when there are target temperatures set for the temperatures of the refrigerants flowing through the utilization-side heat exchangers 52a, 52b, and 52c, the sum of the differences between the target temperatures and the temperatures of the refrigerants flowing through the utilization-side heat exchangers 52a, 52b, and 52c may be used.

(8-8) Others

Note that the plurality of utilization heat exchangers may be connected in parallel to each other with respect to the first switching mechanism. The plurality of utilization heat exchangers may be connected in parallel to each other with respect to the suction flow path.

The plurality of utilization heat exchangers may be connected in parallel to each other with respect to the heat source heat exchanger.

The third communication flow path may connect the plurality of utilization heat exchangers and a side of the heat source heat exchanger that is opposite to a side where the first switching mechanism is provided.

For example, the refrigeration cycle system may be one including a control unit that switches between the first state and the second state of the second switching mechanism.

Note that the first on-off valve only needs to be a valve that can be at least opened and closed, and may be, for example, a valve whose opening degree can be adjusted.

Note that the second on-off valve only needs to be a valve that can be at least opened and closed, and may be, for example, a valve whose opening degree can be adjusted.

For example, the refrigeration cycle system may be one including a control unit that controls the opened and closed states of the second on-off valve.

In this operation, among the plurality of utilization heat exchangers, the utilization heat exchangers each functioning as a radiator for the refrigerant, the utilization heat exchangers each functioning as an evaporator for the refrigerant, and the other utilization heat exchangers each being in an operation stop state or in a state in which the refrigerant does not flow, may coexist.

For example, the refrigeration cycle system may be one including a control unit that executes the operation.

Note that the "all of the plurality of utilization heat exchangers are allowed to function as radiators for the refrigerant" here includes a case where, among the plurality of utilization heat exchangers, not only utilization heat exchangers each functioning as a radiator for the refrigerant, but also utilization heat exchangers each being in an operation stop state or in a state in which the refrigerant does not flow, are present.

For example, the refrigeration cycle system may be one including a control unit that executes the first operation.

Note that, in the second operation, the first connection point, where the second communication flow path and the connection pipe are connected, and the second connection point, where the second communication flow path and the suction flow path are connected, may be allowed to connect.

Note that the "a load of the utilization heat exchanger to be allowed to function as a radiator for the refrigerant" can be a sum of the loads of, among the plurality of utilization heat exchangers, the utilization heat exchangers each functioning as a radiator for the refrigerant, and there can be no load for the utilization heat exchangers each being in an operation stop state or in a state in which the refrigerant does not flow.

For example, the refrigeration cycle system may be one including a control unit that executes, depending on the predetermined level of the load, the first operation or the second operation by switching between them.

For example, the third operation may be: an operation in which all of the plurality of utilization heat exchangers are allowed to function as evaporators for the refrigerant; an operation in which any of the plurality of utilization heat exchangers are allowed to function as evaporators for the refrigerant and the rest are brought into an operation stop state or into a state in which the refrigerant does not flow; an operation in which any of the plurality of utilization heat exchangers are allowed to function as evaporators for the refrigerant and the rest are allowed to function as radiators for the refrigerant; or an operation in which any of the plurality of utilization heat exchangers are allowed to function as evaporators for the refrigerant, any of the rest are allowed to function as radiators for the refrigerant, and the rest are brought into an operation stop state or into a state in which the refrigerant does not flow.

For example, the refrigeration cycle system may be one including a control unit that executes the third operation.

For example, the heat source unit may be one including a casing that houses in its inside each of the above configurations.

For example, the heat source unit may be one including a control unit that switches between the first state and the second state of the second switching mechanism.

Note that the plurality of utilization units may be connected in parallel with respect to the heat source unit.

Although the embodiments of the present disclosure have been described above, it will be understood that various changes in form and details can be made without departing from the spirit and scope of the present disclosure described in claims.

REFERENCE SIGNS LIST

1: refrigeration cycle system
2: heat source unit
2x: secondary-side heat source casing
3a: first utilization unit
3b: second utilization unit
3c: third utilization unit
4: secondary-side unit (refrigeration cycle system, refrigeration cycle apparatus)
4a: secondary-side unit (refrigeration cycle system, refrigeration cycle apparatus)
5: primary-side unit
5a: primary-side refrigerant circuit
5x: primary-side casing
6a-c: branch unit
7: third communication pipe (third communication flow path)
8: first communication pipe (first communication flow path)
9: second communication pipe (second communication flow path)
10: secondary-side refrigerant circuit
11: heat source-side expansion mechanism
12: heat source circuit
13a-c: utilization circuit
14a-c: branch circuit
15a-c: first connection pipe
16a-c: second connection pipe
20: heat source-side control unit
21: secondary-side compressor (compressor)
21a: compressor motor
21b: suction pipe (pipe through which refrigerant to be sucked into compressor flows)
22: secondary-side switching mechanism (first switching mechanism)
23: suction flow path
24: discharge flow path (pipe through which refrigerant discharged from compressor flows)
25: third heat source pipe
26: fourth heat source pipe (third communication flow path, third refrigerant flow path)
27: fifth heat source pipe (third communication flow path, third refrigerant flow path)
28: first heat source pipe (first communication flow path, first refrigerant flow path)
29: second heat source pipe (second communication flow path, second refrigerant flow path)
29a: sixth heat source pipe (second communication flow path, second refrigerant flow path)
29b: seventh heat source pipe (second communication flow path, second refrigerant flow path)
30: accumulator
31: third shutoff valve
32: first shutoff valve
33: second shutoff valve
34: oil separator
35: cascade heat exchanger (heat source heat exchanger)
35a: secondary-side flow path
35b: primary-side flow path
36: heat source-side expansion valve
45: connection path (connection pipe)
45a: connection path (connection pipe)
46: first on-off valve (second switching mechanism)
47: second on-off valve
48: three-way valve (second switching mechanism)
50a-c: utilization-side control unit
51a-c: utilization-side expansion valve
52a-c: utilization-side heat exchanger (utilization heat exchanger)
56a-c: second utilization pipe 57a-c: first utilization pipe
58a-c: liquid-side temperature sensor
60a-c: branch unit control unit
61a-c: third branch pipe
62a-c: merge pipe
63a-c: first branch pipe
64a-c: second branch pipe
66a-c: first regulating valve
67a-c: second regulating valve
70: primary-side control unit
77: outdoor air temperature sensor
80: control unit
151a-c: utilization expansion mechanism
X: first connection point
Y: second connection point

CITATION LIST

Patent Literature

Patent Literature 1: JP 2016-11783 A

The invention claimed is:

1. A refrigeration cycle system using a carbon dioxide refrigerant, comprising:
a heat source circuit including
a compressor,
a heat source heat exchanger,
a first switching mechanism that is located between a pipe through which the refrigerant discharged from the compressor flows and the heat source heat exchanger and switches a flow path, and
a suction flow path that connects the first switching mechanism and a pipe through which the refrigerant to be sucked into the compressor flows;
a plurality of utilization circuits respectively including utilization heat exchangers;
a first communication flow path that connects the plurality of utilization heat exchangers and the first switching mechanism;
a second communication flow path that connects the plurality of utilization heat exchangers and the suction flow path;
a third communication flow path that connects the plurality of utilization heat exchangers and the heat source heat exchanger;
a connection pipe that connects the first communication flow path and the second communication flow path; and
a second switching mechanism that switches between a first state in which the first communication flow path and the second communication flow path connect and a second state in which the first communication flow path and the second communication flow path do not connect, wherein
each utilization circuit respectively includes a merge pipe extending from the utilization heat exchanger, and the first communication flow path and the second communication flow path are connected to the merge pipes.

2. The refrigeration cycle system according to claim 1, wherein
the second switching mechanism is a first on-off valve provided in the connection pipe.

3. The refrigeration cycle system according to claim 2, further comprising a second on-off valve provided, in the second communication flow path, between a first connection point, where the second communication flow path and the connection pipe are connected, and a second connection point where the second communication flow path and the suction flow path are connected, wherein
the second on-off valve is closed when the second switching mechanism is in the first state.

4. A refrigeration cycle system using a carbon dioxide refrigerant, comprising:
a heat source circuit including
a compressor,
a heat source heat exchanger,
a first switching mechanism that is located between a pipe through which the refrigerant discharged from the compressor flows and the heat source heat exchanger and switches a flow path, and
a suction flow path that connects the first switching mechanism and a pipe through which the refrigerant to be sucked into the compressor flows;
a plurality of utilization circuits respectively including utilization heat exchangers;
a first communication flow path that connects the plurality of utilization heat exchangers and the first switching mechanism;
a second communication flow path that connects the plurality of utilization heat exchangers and the suction flow path;
a third communication flow path that connects the plurality of utilization heat exchangers and the heat source heat exchanger;
a connection pipe that connects the first communication flow path and the second communication flow path; and
a second switching mechanism that switches between a first state in which the first communication flow path and the second communication flow path connect and a second state in which the first communication flow path and the second communication flow path do not connect, wherein
the second switching mechanism is a three-way valve, and
the three-way valve does not allow the first connection point, where the second communication flow path and the connection pipe are connected, and the second connection point, where the second communication flow path and the suction flow path are connected, to connect in the first state, and allows the first connection point and the second connection point to connect in the second state.

5. The refrigeration cycle system according to claim 1, the refrigeration cycle system being capable of performing an operation in which while some of the plurality of utilization heat exchangers are allowed to function as radiators for the refrigerant, some of the rest are simultaneously allowed to function as evaporators for the refrigerant.

6. The refrigeration cycle system according to claim 1, the refrigeration cycle system being configured to execute a first operation in which while the second switching mechanism is brought into the first state, the first connection point, where the second communication flow path and the connection pipe are connected, and the second connection point, where the second communication flow path and the suction flow path are connected, are not allowed to connect, and all of the plurality of utilization heat exchangers are allowed to function as radiators for the refrigerant.

7. The refrigeration cycle system according to claim 1, the refrigeration cycle system:
being configured to execute, when a load of the utilization heat exchangers to be allowed to function as radiators for the refrigerant exceeds a predetermined level, a first operation in which while the second switching mechanism is brought into the first state, the first connection point, where the second communication flow path and the connection pipe are connected, and the second connection point, where the second communication flow path and the suction flow path are connected, are not allowed to connect, and all of the plurality of utilization heat exchangers are allowed to function as radiators for the refrigerant; and being configured to bring the second switching mechanism into the second state when the load of the utilization heat exchangers to be allowed to function as radiators for the refrigerant is equal to or less than the predetermined level.

8. The refrigeration cycle system according to claim 1, the refrigeration cycle system being configured to execute a third operation in which the second switching mechanism is brought into the second state, and at least some of the plurality of utilization heat exchangers are allowed to function as evaporators for the refrigerant.

9. A heat source unit of a refrigeration cycle apparatus using a carbon dioxide refrigerant, the heat source unit comprising:
a compressor;
a heat source heat exchanger;
a first switching mechanism being located between a pipe through which the refrigerant discharged from the compressor flows and the heat source heat exchanger and the first switching mechanism switching a flow path;
a suction flow path that connects the first switching mechanism and a pipe through which the refrigerant to be sucked into the compressor flows;
a first refrigerant flow path connected to the first switching mechanism;
a second refrigerant flow path connected to the suction flow path;
a third refrigerant flow path connected to the heat source heat exchanger;
a connection pipe that connects the first refrigerant flow path and the second refrigerant flow path; and
a second switching mechanism that switches between a first state in which the first refrigerant flow path and the second refrigerant flow path connect and a second state in which the first refrigerant flow path and the second refrigerant flow path do not connect;
a plurality of utilization units respectively including utilization heat exchangers;
a first communication pipe that is connected to the first refrigerant flow path and connects the heat source unit and the plurality of utilization units;
a second communication pipe that is connected to the second refrigerant flow path and connects the heat source unit and the plurality of utilization units; and
a third communication pipe that is connected to the third refrigerant flow path and connects the heat source unit and the plurality of utilization units.

10. The refrigeration cycle system according to claim 2, the refrigeration cycle system being capable of performing an operation in which while some of the plurality of utilization heat exchangers are allowed to function as radiators for the refrigerant, some of the rest are simultaneously allowed to function as evaporators for the refrigerant.

11. The refrigeration cycle system according to claim 3, the refrigeration cycle system being capable of performing an operation in which while some of the plurality of utilization heat exchangers are allowed to function as radiators for the refrigerant, some of the rest are simultaneously allowed to function as evaporators for the refrigerant.

12. The refrigeration cycle system according to claim 4, the refrigeration cycle system being capable of performing an operation in which while some of the plurality of utilization heat exchangers are allowed to function as radiators for the refrigerant, some of the rest are simultaneously allowed to function as evaporators for the refrigerant.

13. The refrigeration cycle system according to claim 2, the refrigeration cycle system being configured to execute a first operation in which while the second switching mechanism is brought into the first state, the first connection point, where the second communication flow path and the connection pipe are connected, and the second connection point, where the second communication flow path and the suction flow path are connected, are not allowed to connect, and all of the plurality of utilization heat exchangers are allowed to function as radiators for the refrigerant.

14. The refrigeration cycle system according to claim 3, the refrigeration cycle system being configured to execute a first operation in which while the second switching mechanism is brought into the first state, the first connection point, where the second communication flow path and the connection pipe are connected, and the second connection point, where the second communication flow path and the suction flow path are connected, are not allowed to connect, and all of the plurality of utilization heat exchangers are allowed to function as radiators for the refrigerant.

15. The refrigeration cycle system according to claim 4, the refrigeration cycle system being configured to execute a first operation in which while the second switching mechanism is brought into the first state, the first connection point, where the second communication flow path and the connection pipe are connected, and the second connection point, where the second communication flow path and the suction flow path are connected, are not allowed to connect, and all of the plurality of utilization heat exchangers are allowed to function as radiators for the refrigerant.

16. The refrigeration cycle system according to claim 5, the refrigeration cycle system being configured to execute a first operation in which while the second switching mechanism is brought into the first state, the first connection point, where the second communication flow path and the connection pipe are connected, and the second connection point, where the second communication flow path and the suction flow path are connected, are not allowed to connect, and all of the plurality of utilization heat exchangers are allowed to function as radiators for the refrigerant.

17. The refrigeration cycle system according to claim 2, the refrigeration cycle system:
being configured to execute, when a load of the utilization heat exchangers to be allowed to function as radiators for the refrigerant exceeds a predetermined level, a first operation in which while the second switching mechanism is brought into the first state, the first connection point, where the second communication flow path and the connection pipe are connected, and the second connection point, where the second communication flow path and the suction flow path are connected, are not allowed to connect, and all of the plurality of utilization heat exchangers are allowed to function as radiators for the refrigerant; and
being configured to bring the second switching mechanism into the second state when the load of the utilization heat exchangers to be allowed to function as radiators for the refrigerant is equal to or less than the predetermined level.

18. The refrigeration cycle system according to claim 3, the refrigeration cycle system:
- being configured to execute, when a load of the utilization heat exchangers to be allowed to function as radiators for the refrigerant exceeds a predetermined level, a first operation in which while the second switching mechanism is brought into the first state, the first connection point, where the second communication flow path and the connection pipe are connected, and the second connection point, where the second communication flow path and the suction flow path are connected, are not allowed to connect, and all of the plurality of utilization heat exchangers are allowed to function as radiators for the refrigerant; and
- being configured to bring the second switching mechanism into the second state when the load of the utilization heat exchangers to be allowed to function as radiators for the refrigerant is equal to or less than the predetermined level.

19. The refrigeration cycle system according to claim 4, the refrigeration cycle system:
- being configured to execute, when a load of the utilization heat exchangers to be allowed to function as radiators for the refrigerant exceeds a predetermined level, a first operation in which while the second switching mechanism is brought into the first state, the first connection point, where the second communication flow path and the connection pipe are connected, and the second connection point, where the second communication flow path and the suction flow path are connected, are not allowed to connect, and all of the plurality of utilization heat exchangers are allowed to function as radiators for the refrigerant; and
- being configured to bring the second switching mechanism into the second state when the load of the utilization heat exchangers to be allowed to function as radiators for the refrigerant is equal to or less than the predetermined level.

* * * * *